US010969036B2

(12) United States Patent
Fortner et al.

(10) Patent No.: US 10,969,036 B2
(45) Date of Patent: Apr. 6, 2021

(54) HIGH FLOW MULTI-WAY PISTON VALVE FOR DEPOSITION SYSTEMS

(71) Applicant: Lam Research Corporation, Fremont, CA (US)

(72) Inventors: James Isaac Fortner, Newberg, OR (US); Robert Rash, West Linn, OR (US); Aaron Berke, Portland, OR (US); Jingbin Feng, Lake Oswego, OR (US)

(73) Assignee: Lam Research Corporation, Fremont, CA (US)

( * ) Notice: Subject to any disclaimer, the term of this patent is extended or adjusted under 35 U.S.C. 154(b) by 30 days.

(21) Appl. No.: 15/993,422

(22) Filed: May 30, 2018

(65) Prior Publication Data
US 2019/0368630 A1    Dec. 5, 2019

(51) Int. Cl.
*F16K 37/00*   (2006.01)
*F16K 11/085*  (2006.01)
*F16K 31/122*  (2006.01)

(52) U.S. Cl.
CPC ...... *F16K 37/0041* (2013.01); *F16K 11/0856* (2013.01); *F16K 31/1221* (2013.01)

(58) Field of Classification Search
CPC ............. F16K 37/0041; F16K 11/0856; F16K 31/1221; Y10T 137/86549
See application file for complete search history.

(56) References Cited

U.S. PATENT DOCUMENTS

| 4,699,171 A | 10/1987 | Sugden |
| 5,348,036 A * | 9/1994 | Oksanen ................. G05D 7/03 137/1 |
| 5,704,386 A | 1/1998 | Lehmann et al. |
| 2003/0098073 A1* | 5/2003 | Jannotta ............. F16K 37/0008 137/553 |
| 2006/0236513 A1 | 10/2006 | Sandhu et al. |
| 2018/0142794 A1 | 5/2018 | Dennis et al. |

FOREIGN PATENT DOCUMENTS

JP    2005098500 A    4/2005

OTHER PUBLICATIONS

Park, Hye Lyun _ International Search Report and Written Opinion _ PCT/US2019/032743_dated Sep. 11, 2019_13 pages.

* cited by examiner

*Primary Examiner* — Kevin R Barss
(74) *Attorney, Agent, or Firm* — Penilla IP, APC

(57) ABSTRACT

A valve assembly used with a process chamber for depositing a film on a wafer. A valve body surrounds a bore and includes an inlet, a first outlet and a second outlet, at least one of them exiting into the process chamber. A piston includes a first section having a first flow path, and a second section having a second flow path. A linear motion actuator is adapted to couple with the piston and controls linear movement of the piston through the bore between a first position and a second position. In the first position, the first section of the piston is aligned with the inlet such that fluid flows to the first outlet via the first flow path. In the second position, the second section of the piston is aligned with the inlet such that fluid flows to the second outlet via the second flow path.

10 Claims, 21 Drawing Sheets

HIGH FLOW MULTI-WAY PISTON VALVE FOR DEPOSITION SYSTEMS

TECHNICAL FIELD

The present embodiments relate to semiconductor substrate processing equipment tools, and more particularly, a high flow piston valve for switching liquid chemical flow from an inlet path to one or more outlet paths with a low pressure drop across the valve.

BACKGROUND OF THE DISCLOSURE

In semiconductor processing systems including those performing deposition, fluid transport is implemented through piping with valve systems to control the fluid flow path. These valve systems meet certain high-purity chemically rated characteristics that are suitable for fluid transport. However, the valve systems meeting the above characteristics typically have very large bodies relative to the pipe internal diameter, which precludes use of these typical valve systems in processing systems that have tight space constraints. In addition, some typical valve systems that use diaphragm valves are limited by the valve's poor flow coefficients, and those valve systems therefore are unsuitable for use in systems requiring high flow rates (within very small spatial envelopes) (e.g., for performing deposition). That is, the performance of traditional high flow diaphragm valves suffers when the space is smaller than typically encountered.

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure It is in this context that embodiments of the disclosure arise.

SUMMARY

The present embodiments relate to solving one or more problems found in the related art, and specifically to perform semiconductor processes including the switching of fluid flow from an inlet to one or more outlet paths with a low pressure drop within a confined form factor. Several inventive embodiments of the present disclosure are described below.

Embodiments of the present disclosure include a valve assembly suitable for use in a process chamber (e.g., electroplating cell) for depositing a film on a wafer. The valve assembly includes a valve body configured to surround a bore aligned with a central axis, wherein the valve body includes an inlet, a first outlet, and a second outlet, wherein at least one of the first and second outlet exiting into the process chamber or chemical bath. The valve assembly includes a piston having a first section and a second section, wherein the first section is configured to have a first flow path, and wherein the second section is configured to have a second flow path. The valve assembly includes a linear motion actuator adapted to couple with the piston and configured to control linear movement of the piston through the bore between a first position and a second position. In particular, in the first position the first section of the piston is aligned with the inlet such that fluid flows from the inlet to the first outlet via the first flow path. Also, in the second position the second section of the piston is aligned with the inlet such that fluid flows from the inlet to the second outlet via the second flow path.

Other embodiments of the present disclosure include another valve assembly suitable for use with a process chamber (e.g., electroplating cell) for depositing a film on a wafer. The valve assembly includes a valve body configured to surround a bore aligned with a central axis, wherein the valve body includes an inlet, a plurality of outlets at least one of which exiting into the process chamber. The valve assembly includes a piston having a plurality of flow paths. The valve assembly includes a linear motion actuator adapted to couple with the piston and configured to control linear movement of the piston through the bore between a plurality of positions. In particular, in a corresponding position the piston is moved such that fluid flows from the inlet to one or more outlets via one or more corresponding flow paths.

Another embodiment of the present disclosure includes a method for switching between flow paths suitable for use with a process chamber (e.g., electroplating cell) for depositing a film on a wafer. The method includes providing a valve body configured to surround a bore aligned with a central axis, wherein the valve body includes an inlet, a plurality of outlets at least one of which exiting into the process chamber. The method includes positioning a piston within the bore of the valve body, the piston having a plurality of flow paths. The method includes controlling linear movement of the piston along the central axis through the bore between a plurality of positions. In particular, in a corresponding position of the piston within the valve body fluid flows from the inlet to one or more outlets via one or more corresponding flow paths.

Embodiments of the present disclosure include a valve assembly suitable for use in a process chamber (e.g., electroplating cell) for depositing a film on a wafer. The valve assembly includes a valve body configured to surround a bore aligned with a central axis, wherein the valve body includes an inlet and an outlet. The valve assembly includes a piston having a first section and a second section, wherein the first section is configured to have a first flow path of high flow, and wherein the second section is configured to have a second flow path of low flow. The valve assembly includes a linear motion actuator adapted to couple with the piston and configured to control linear movement of the piston through the bore between a first position and a second position. In particular, in the first position the first section of the piston is aligned with the inlet such that fluid flows from the inlet to the outlet via the first flow path These and other advantages will be appreciated by those skilled in the art upon reading the entire specification and the claims.

BRIEF DESCRIPTION OF THE DRAWINGS

The embodiments may best be understood by reference to the following description taken in conjunction with the accompanying drawings.

FIGS. 4A-1, 4A-2, and 4B-1 through 4B-3 are diagrams of a multi-way piston/valve assembly suitable for use in a process chamber for depositing a film on a wafer, wherein the piston/valve assembly is adaptable to present different sets of outflow paths depending on which piston (and corresponding internal flow paths) is selected for use in the same valve body, in accordance with embodiments of the present disclosure.

DETAILED DESCRIPTION

Figure 1A:
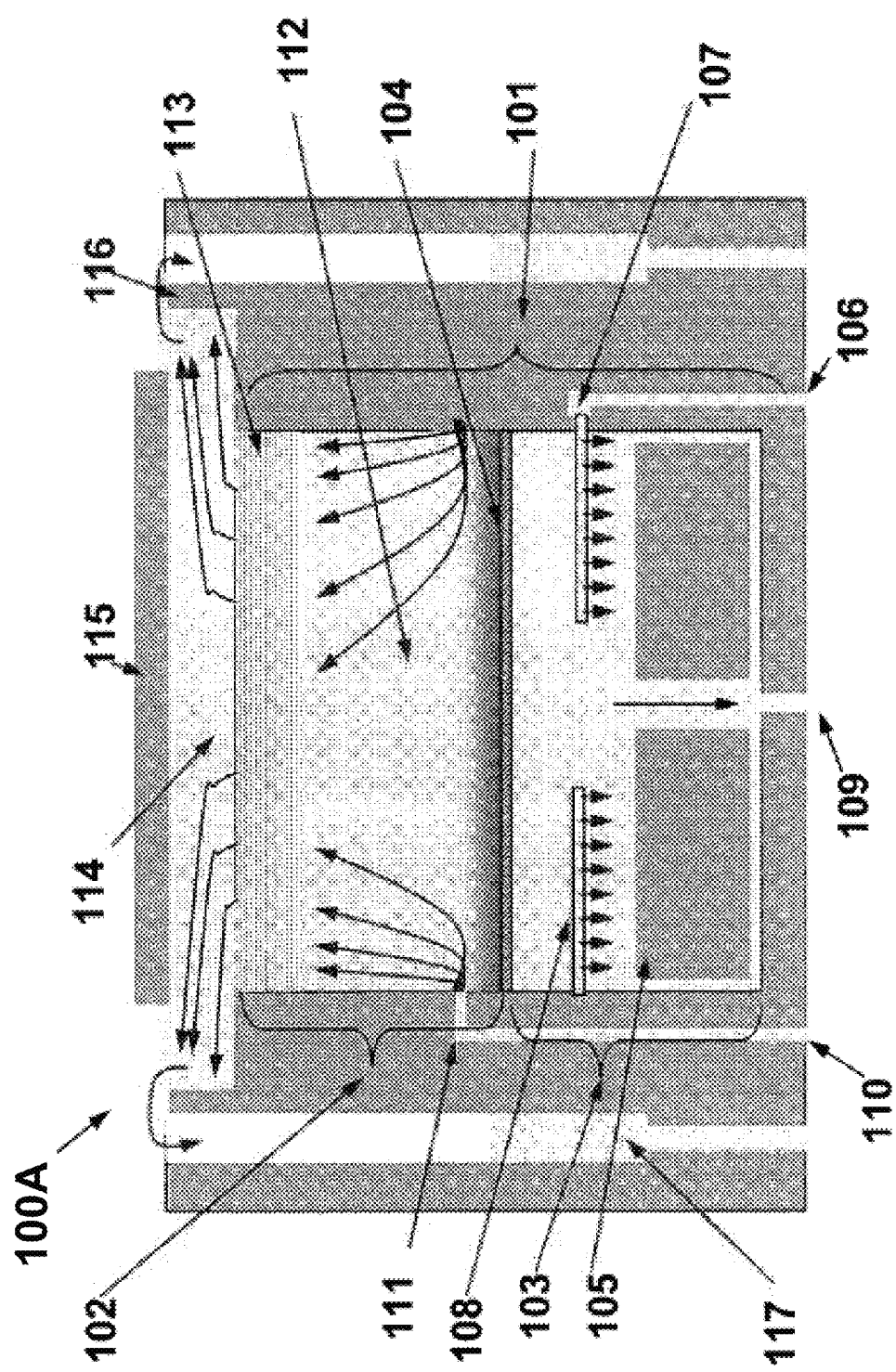
FIG. 1A illustrates an example of a dual chamber (separated anode) electroplating cell layout and components along with an exemplary flow patter within the apparatus, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods that provide a novel method for switching liquid chemical flow to multiple outlet paths using a piston assembly acting as a valve with a low pressure drop across the piston assembly, wherein the piston assembly is suitable for use in a process chamber (e.g., electroplating cell) for depositing (e.g., wet deposition) a film on a wafer. The piston assembly includes an internal piston with multiple bores that is actuated back and forth, altering the flow path depending on which bore is aligned with the flow path. The bores can vary in diameter and direction, and are configured to either switch inlet flow between multiple outlet flows, or to restrict flow for a single inlet and outlet. The valve architecture in the piston assembly is such that the internal piston can be easily replaced with various designs, allowing for the same valve body in the piston assembly and control mechanism to be used in a large variety of applications. For example, the same valve body can be used with multiple piston configurations one-at-a time allowing the piston assembly (e.g., valve) to be converted from a three-way piston assembly to a four or five-way piston assembly, with many possible outlets. In one embodiment, the linear motion actuator is a pneumatic cylinder. In other embodiments, a linear actuator or solenoid could replace the pneumatic cylinder, thereby allowing the valve to be electrically driven.

Advantages of the piston assembly of embodiments of the disclosure include the use of a much smaller valve body in the piston assembly than in existing solutions, thereby allowing for much more close integration with the cell (e.g., process chamber). In one embodiment, the piston assembly is embedded within the process chamber (e.g., with the plating cell itself). Another advantage is that the piston assembly has similar flow characteristics as traditional valve systems but within a smaller form factor. For example, the piston assembly of embodiment of the present disclosure uniquely includes the benefits of a ball valve within much smaller packaging than what exists on the market today. In particular, embodiments of the disclosure describing the piston assembly acting as a valve has no restriction in the normal flow path, and only a bend in the diverted path. The coefficient of flow (e.g., $C_v$) values may be similar to those of a ball valve, but without the very large actuator housing for a ball valve. Other advantages include the piston assembly acting as a valve can be used in multiple use cases: such as, switching between high and low flow orifices, fast duty cycle alternating flow paths, or simply as a two way valve. A linear actuator or solenoid could replace the pneumatic cylinder, allowing the valve to be electrically driven. In still another embodiment, the piston assembly of embodiments of the disclosure includes direct state detection of the piston itself, which is more reliable than using a remote poppet for use with diaphragm valves, or an encoder, as with ball valve actuators.

With the above general understanding of the various embodiments, example details of the embodiments will now be described with reference to the various drawings. Similarly numbered elements and/or components in one or more figures are intended to generally have the same configuration and/or functionality. Further, figures may not be drawn to scale but are intended to illustrate and emphasize novel concepts. It will be apparent, that the present embodiments may be practiced without some or all of these specific details. In other instances, well-known process operations have not been described in detail in order not to unnecessarily obscure the present embodiments.

Embodiments of the present disclosure relate to fluid flow within plasma process modules, such as those used in electroplating, electroetching, electropolishing, electro chemical mechanical polishing, deposition, wet deposition, atomic layer deposition (ALD), plasma enhanced chemical vapor deposition (PECVD) and through silicon via (TSV) processes. Embodiments of the present disclosure may be implemented in various process module configurations. Further, embodiments of the present disclosure are not limited to the examples provided herein, and may be practiced in different plasma processing systems employing different configurations, geometries, and plasma-generating technologies (e.g., inductively coupled systems, capacitively coupled systems, electron-cyclotron resonance systems, microwave systems, etc.). Examples of plasma processing systems and plasma process modules are disclosed in commonly owned U.S. Pat. Nos. 8,862,855, and 8,847,495, and 8,485,128, and U.S. patent application Ser. No. 15/369,110.

For purposes of illustration only, embodiments of the present disclosure may be used in combination with an electroplating cell design containing 1) an anolyte chamber (sometimes referred to herein as a "separated anode chamber") having at least one anode and a 2) catholyte chamber, in communication with the anolyte chamber, typically containing a High Resistance Virtual Anode "HRVA" plate (alternatively, a flow diffuser plate). The anolyte and catholyte chambers are connected to, and in electrical (cationic) communication with each other through a cationic membrane. The catholyte chamber has a mechanism for mixing and directing catholyte flow in the catholyte chamber, particularly around and upon the cationic membrane surface, to improve the general material transport to and away from the membrane surface.

Various "clamshell" electroplating apparatus designs (e.g., the Sabre™ apparatus available from Lam Research Corp. of San Jose Calif.) have two chambers, an anolyte chamber and a catholyte chamber. The anolyte and the catholyte chambers are separated from each other by a cationic membrane. The anolyte chamber contains one or more counter electrodes as well as one or more energized electrodes that have the same general polarity as the wafer and an electrolyte is in direct contact with the electrodes. In some embodiments, these energized electrodes may be an auxiliary secondary cathode, such as described in U.S. patent application Ser. No. 12/481,503, filed Jul. 9, 2009, and entitled METHOD AND APPARATUS FOR ELECTROPLATING, which is incorporated by reference in its entirety.

The catholyte chamber, not containing a counter electrode, typically has a uniquely different electrolyte composition, a separate mechanism of internally circulating electrolyte (catholyte), and a separate supply of electrolyte than the anolyte chamber, the electrolyte contained therein capable of making direct contact with the work piece (e.g., a wafer). A design for substantially directing flow and/or the passage of electrical current uniformly to the work piece, such as by a micro-porous diffuser (typically greater than about 20% porous; see U.S. Pat. No. 6,964,792, issued Nov. 15, 2005 and incorporated herein by reference) or a HRVA plate (see U.S. Pat. No. 7,622,024, issued Nov. 24, 2009 and incorporated herein by reference), may be used. The HRVA plate is typically less porous than a more simple flow diffuser (a HRVA plate is typically less than about 5% porous) and imparts a significantly larger electrical resistance to the system (adding resistance improves uniformity/control), but, like the diffuser, creates a uniform flow of electrolyte at the wafer.

In certain described embodiments, the catholyte chamber contains peripheral walls, a HRVA plate (or diffuser) that faces and is in close proximity (typically less than about 5 mm) to the substrate (wafer) being plated, and a mechanism of directing electrolyte into the chamber. The main flow loop electrolyte enters the catholyte chamber, passes up through the HRVA plate (or diffuser) through various pores or holes, and then impinges on a wafer surface. After being directed generally towards and passing near the wafer surface, the fluid passes out of the plating cell and eventually back to the main bath tank.

The anolyte chamber contains peripheral walls and has a separate flow of (typically) substantially organic-additive-free plating solution (i.e., electrolyte, or anolyte) which circulates in a manner separate from the uniquely different "main plating solution flow loop" electrolyte (i.e., catholyte) that makes contact with the wafer surface.

Figures 1, 4A:
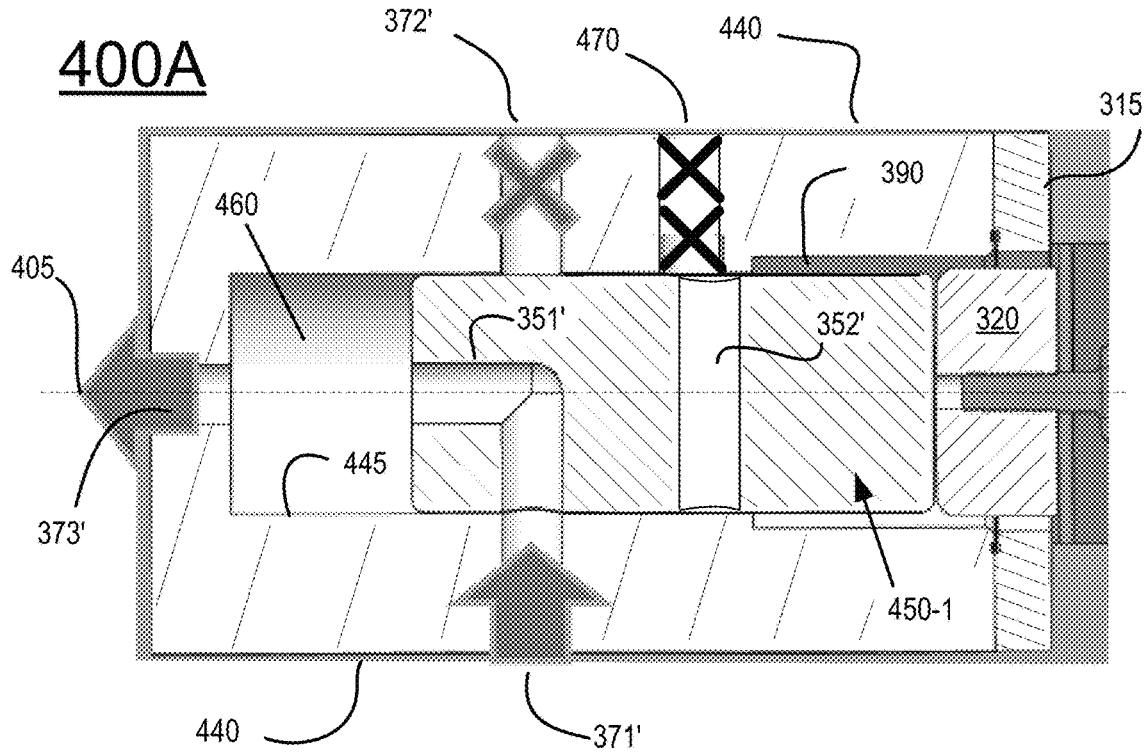
Figures 2, 4A:
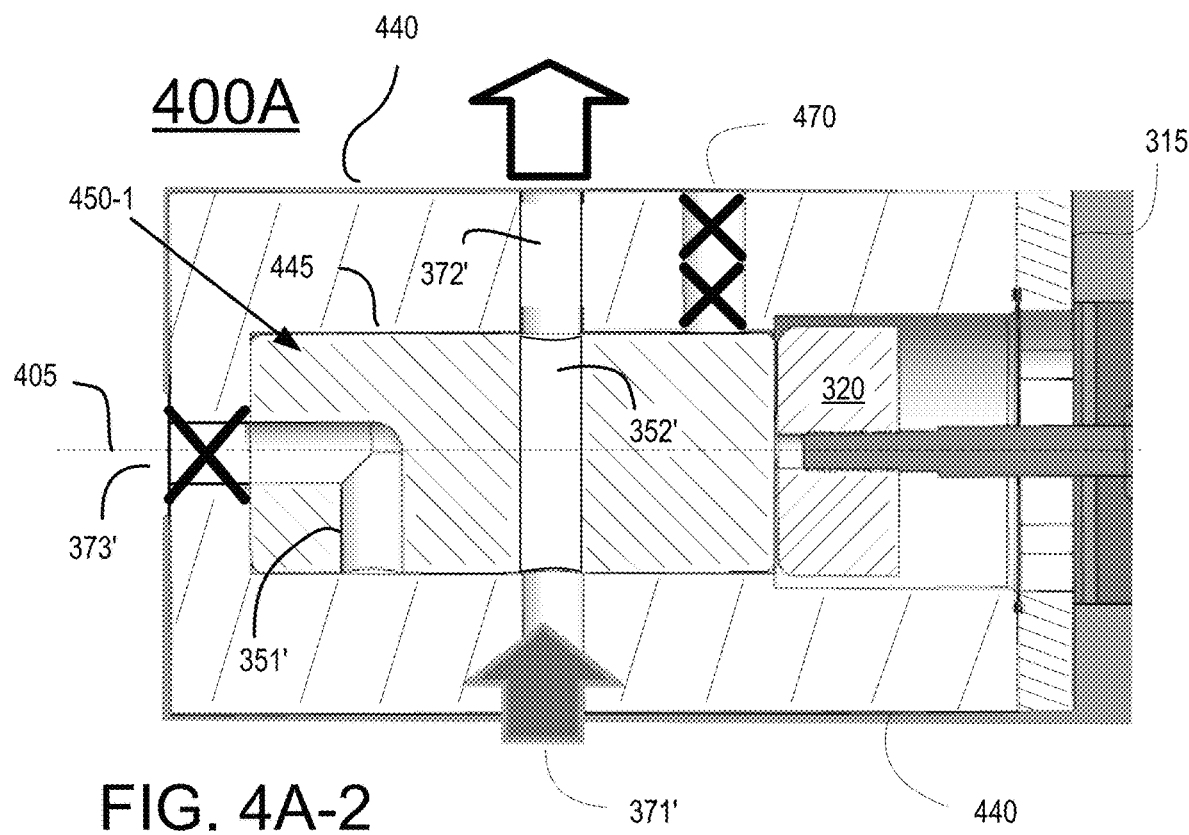

FIG. 1 depicts an example of a dual chamber (separated anode) electroplating cell layout and components along with what might be the typical flow pattern within an apparatus containing some (but not all) of the elements in accordance with various embodiments. Note that this and later figures are offered as examples for illustration purposes, and should not be construed to be limiting to the general applicability of embodiments to any particular cell, for example, or with respect to any particular spatial orientation, required elements, dimensions, or design components. Electroplating cell 100A includes a chamber 101 that includes a catholyte chamber 102 and an anolyte chamber 103. At one extremity of the anolyte chamber resides a membrane 104 (e.g., a cationic membrane), completely enclosing the anode 105 to create the anolyte chamber 103. The membrane may be supported by a membrane frame (not shown). The anode may be either an active (dissolvable) metal or metal alloy (e.g., copper, copper/phosphorous, lead, silver/tin) to be plated or an inert (dimensionally stable, e.g., platinum coated titanium) anode. The anode is connected to one pole of a power supply (not shown). The two separate chambers, with two separate electrolyte flow loops, generally have electrolytes of different compositions, with different electrolyte properties (e.g., typically, the electrolyte in the anolyte chamber is substantially free of electrochemical organic bath additives).

A flow of electrolyte is fed into the anolyte chamber at location 106 and then into a manifold 107 where it enters one or more flow distribution tubes (also referred to as irrigation "flutes" or nozzles) 108. Embodiments of the present disclosure may be used to control the fluid flow to the anolyte chamber using the piston assembly described below. Note that in FIG. 1, for clarity, the anolyte chamber electrolyte flow loop is only shown on the right hand side of the drawing. The flow distribution tubes "spray" electrolyte in the general direction of the anode 105 surface so as to impinge on the anode surface, thereby increasing the convection of dissolved ions from the anode surface or electrolyte reactant to the surface (if required). In an example of another embodiment that is not illustrated, the anode is porous, composed of an assembly or pile of relatively small individual active metal piece (e.g., individual spheres). The porous metal pile allows easy anode replenishment as well as the direct passage of electrolyte fluid upwards or downwards through the "porous anode pile". This type of apparatus typically consists of an inlet anolyte flow manifold residing at the bottom of the anode chamber, that further contains a mechanism for directing flow upward though a porous anode electrical-terminal-plate (or anode buss plate), which is designed to allow uniform flow of electrolyte and supply of current into and though the assembly of individual anode pieces. See U.S. Pat. Nos. 6,527,920, 6,890,416, and 6,821,407, incorporated herein by reference for all purposes, as further examples of separated anode chamber designs. The flow exits the anode chamber of FIG. 1, at location 109. The anolyte chamber is bounded by peripheral insulating walls made of a non-conducting material (e.g., various plastics like polypropylene).

The flow of electrolyte directed to the anode surface reduces the concentration polarization (i.e., the voltage increase associated with the build up of or depletion of dissolved active species, constituting a diffusion resistances and polarization) and mitigates any tendency for the anode surface to become passivated. Anode passivation is a phenomena where a metal salt, oxide, phosphate sulfide, or other form of a surface film forms, for example, as a result of surpassing the local solubility limit of the material.

As noted above, the anolyte chamber and the catholyte chamber are separated by an ionically permeable, electrolyte and additive diffusion- and flow-resistant membrane (typically, a cationic membrane). Cations traverse the membrane, from the anolyte chamber to the catholyte chamber, under the influence of the electric field, on their way towards the substrate (wafer) being plated. The membrane substantially prevents the diffusion or convection of other non-positively charged electrolyte components from passing out of or into the anolyte chamber, such as anions and uncharged organic plating additives. In some instances, the anolyte chamber and its recirculation flow loop (if any) are substantially free of plating additives, while the catholyte chamber may contain target levels of plating bath additives (e.g., accelerators, suppressors, levelers, and the like) required to support the operation of the plating process on the substrate (for example, low concentration of chloride ions, plating bath organic compounds such as thiourea, benzotrazole, mercaptopropane sulphonic acid (MPS), dimercaptopropane sulphonic acid (SPS), polyethylene oxide, polyproplyene oxide, and their various copolymers, etc.).

Media that are micro-porous and resist direct fluid transport can serve as membranes. The membrane may be a cationic conducting membrane. In some cases, the membrane is supported by a mechanically supporting frame member (not shown) at its uppermost and/or bottommost surface, which helps to fix and confine the membrane in a particular shape (e.g., conical) and remain relatively rigid despite electrolyte flow or small differential pressures between the two sides of the membrane and between the two chambers.

While the membrane is an electrically dielectric (i.e. an electron-conduction-resistive material) and there is no free flow of electron charge transfer at the surface of, or within, the membrane, ionically charged species exit the membrane in a somewhat analogous fashion to an anode source, and the concentration profiles near the interfaces are believe to be qualitatively similar. While not being held to any particular theory, it is believed that the membrane acts in some respects similar to a conventional source of ions (such as an active metallic anode electrode interface undergoing an electrochemical oxidation process).

Charged species, when they pass through any porous barrier under the impetus of an electric field, do so largely at a rate proportional to their concentrations and ionic mobility. Diffusion is largely limited (at least initially on start up) because of the absence of any significant concentration driving force, as well as because of the tortuous nature of the membrane barrier. Smaller ions that tend to have high ionic mobilities (e.g., protons) tend to migrate more rapidly. In an electrolyte containing two or more cations, the ion with the higher mobility will tend to favorably pass out of the anolyte chamber. As a result, the concentration of the ion with the lower ionic mobility (for example a larger metal ion) will tend to accumulate in the anolyte chamber. Eventually (in the case of an active metal anode configuration) the concentration of the lower mobility metal ion created at the anode can increase substantially, often approaching the solubility limit of that ion in the anode chamber. In any case, the concentration difference between the ions with the different mobilities between the two sides of the membrane increases with the passage of charge and time. If left unaltered, the concentration difference may eventually become sufficiently large enough between the two chambers so that the electric field induced flux of each ionic species (given by the product of the ion concentration times its mobility) will closely balance the time average diffusion of that species in the opposite direction.

For example, in the case of a chamber containing a copper anode and a mixed electrolyte such as copper sulfate and sulfuric acid, smaller hydrated hydrogen ion protons will migrate out of and across the membrane preferentially, tending to increase the catholyte chamber's pH. In contrast, the concentration of copper will increase within the anolyte chamber. Furthermore, a cationic membrane allows very little anion (sulfate and bisulfate, in this example) to pass. Within a cationic membrane, the mobile charged cationic species is typically paired to an anion end group (e.g., a polymer bound anionic sulphonate group) tethered to the ends of a polymeric backbone. The cation moves under the force of the electric field from the environment of one fixed/tethered anion to the next (thereby maintaining charge neutrality within the membrane). The electrochemistry and the concentration profiles of various species in an electroplating cell are discussed in more detail herein.

Turning back to FIG. 1, similar to the mode by which electrolyte enters the anolyte chamber, electrolyte enters the catholyte chamber at location 110 and enters a manifold 111 that surrounds the catholyte chamber, from where it is introduced into the central regions of catholyte chamber 112 below the HRVA plate 113. Embodiments of the present disclosure may be used to control the fluid flow to the catholyte chamber using the piston assembly described below. Note that in FIG. 1, for clarity, the catholyte chamber electrolyte flow loop is only shown on the left hand side of the drawing. As shown in FIG. 1, flow entering from the periphery tends to travel in currents of decreasing velocity at locations more central to catholyte chamber, largely because the summation of the cross sectional area for the flow out through the HRVA is greatest, and the integral resistance to flow smallest, at the HRVA periphery. The result is uniform flow up through the HRVA and into the wafer/HRVA gap region 114 below wafer 115. After passing out through the HRVA the fluid eventually makes it way to over a plating cell weir wall 116 and into a collection chamber 117, from where it is collected and returned to the catholyte circulation bath storage tank. The catholyte chamber also has non-conducting peripheral walls.

Due to the ever increasing need to establish more uniform fluid and plating current flow to a thinner seeded wafer, a High Resistance Virtual Anode "plate" (HRVA) may be employed to beneficially introduce a significant terminal effect compensating resistance to the system. One example of a HRVA containing apparatus is described in U.S. patent application Ser. No. 12/291,356 titled METHOD AND APPARATUS FOR ELECTROPLATING, filed Nov. 7, 2008, which is incorporated herein by reference in relevant part. See also U.S. patent application Ser. No. 11/506,054 titled METHOD AND APPARATUS FOR ELECTROPLATING INCLUDING A REMOTELY POSITIONED SECOND CATHODE, filed Aug. 16, 2006, which is incorporated herein by reference in relevant part. The wafer is brought into close proximity to (e.g., 1-5 mm from) the HRVA plate surface during plating operations. The HRVA plate introduces a resistance to both electrical conduction and fluid flow, making both more uniformly distributed across the plate and across the wafer near its surface.

However, to ensure uniform flow upwards through the HRVA plate, the portion of the catholyte chamber below the HRVA plate, which acts as a fluid dispensing manifold region, needs to have a substantial depth and cross sectional flow area to allow the resistance to be dominated by the HRVA pores or holes. In a sense, an HRVA plate is similar to a diffuser plate, but has a greater resistance to both fluid and current flow. Both the HRVA and the diffuser are typically relatively thin plates (about 0.125 to 1 inches thick). An HRVA plate typically has a very low, uniform, continuous, and in some embodiments, unidirectional porosity. Unidirectional porosity is created, for example, by creating a large number or small precision holes in a non-porous substrate, typically about 1-5% of the plate's material; see U.S. patent application Ser. No. 11/506,054 (filed Aug. 16, 2006), U.S. patent application Ser. No. 12/291,356 (filed Nov. 7, 2008), and U.S. Pat. No. 7,622,024, each incorporated herein by reference. The HRVA holes are created by drilling, etching, creating a replicate structure, or other appropriate processes, resulting in an insulating surface having a very large number of high precision parallel fine holes (typically 0.02 to 0.04 inch diameter) in a substrate/plate. The unidirectional holes/pores generally prevent any fluid or electrical current from passing in any direction that is not directly towards the work piece (e.g., traveling/leakage from just below the plate at an radial angle though the plate towards the wafer periphery). This promotes a uniform flow distribution and potential distribution.

Note that in some instances, components in the electroplating cell shown in FIG. 1 are referred to by different names. Sometimes, chambers 102 and 103 are collectively referred to as an anode chamber. Chamber 102 is then an upper anode chamber and chamber 103 is a lower anode chamber. In this case, chamber 103 is referred to as a separated anolyte chamber (SAC), wherein the SAC contains the anode and is separated from the upper anode chamber by membrane 104. The region and the fluid between membrane 104 and the lower surface of the HRVA plate 113 (i.e., region 112), plus that within HRVA plate itself, constitute the catholyte chamber. Also, the catholyte chamber is sometimes referred to as the Diffuser or HRVA chamber. The HRVA plate 113 mounts onto the anode chamber (102 and 103), creating region 114 between the wafer and the top of the HRVA plate, which in this case is referred to as the wafer-to-HRVA gap region (alternatively diffuser-to-wafer gap region).

Figure 1B:
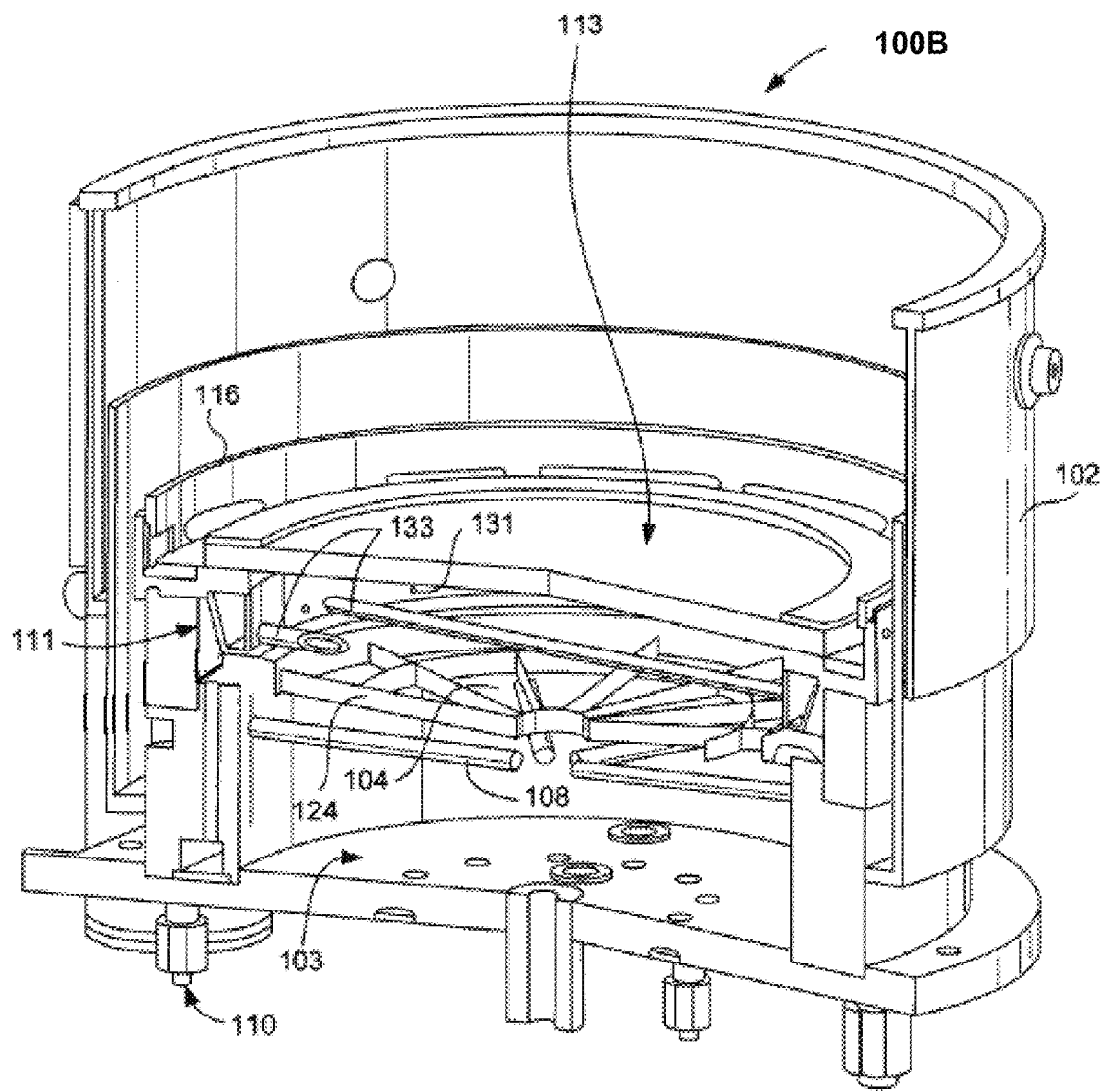
FIG. 1B is a perspective view of an electroplating cell layout, in accordance with one embodiment of the present disclosure.

FIG. 1B depicts an example of an electroplating cell 100B layout and components along with what might be the typical flow pattern within the apparatus. The electroplating cell 100B shown in FIG. 1B is similar to electroplating cell 100A shown in FIG. 1A, but with the addition of a few components. Electroplating cell 100B includes flow distribution tubes 133 associated with the catholyte manifold 111. In some embodiments, the flow distribution tubes 133 are composed of a non-conducting material, such as a polymer or ceramic. In some embodiments, a flow distribution tube is a hollow tube with walls composed of small sintered particles. In other embodiments, a flow distribution tube is a solid walled tube with drilled holes therein. Other designs are also possible that enable good mixing in the catholyte chamber. In various configurations, the flow distribution tubes may be oriented with their openings (e.g., such as holes) arranged to direct fluid flow at the membrane interface, and/or oriented or configured to direct fluid flow to regions in the catholyte chamber other than the membrane interface. The location and size of the flow distribution tubes 133 should be such that the average electric field and current flow-blocking characteristics of the tubes are minimized, so as to achieve the most uniform plating possible.

Figure 3A:
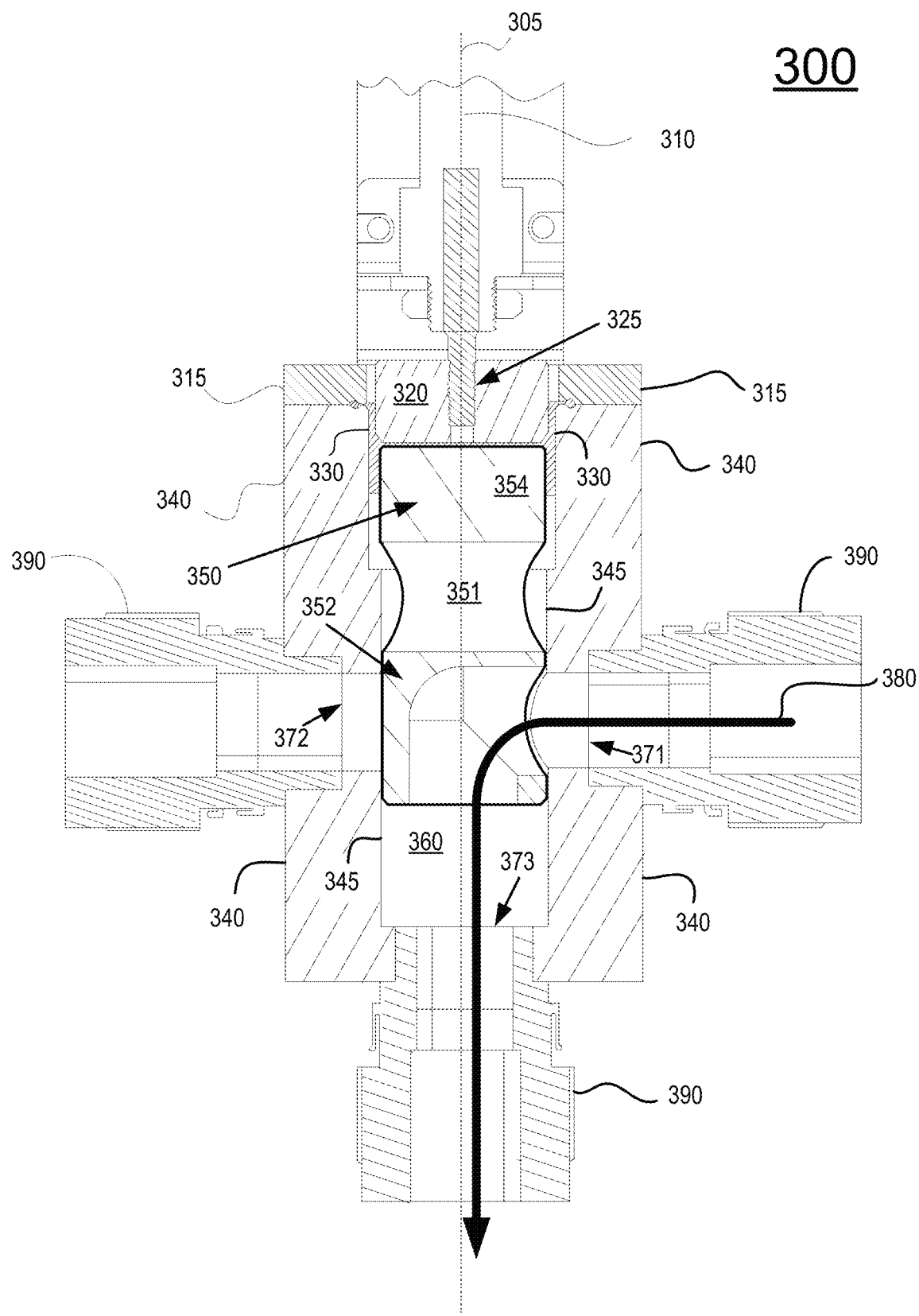
FIG. 3A is a cross-sectional diagram of a three-way piston assembly suitable for use in a process chamber for depositing a film on a wafer, wherein the piston is configured for fluid flowing from an inlet to an outlet via a ninety-degree angled flow path through the piston assembly, wherein the angled flow path may be a high resistance virtual anode (HRVA) flow orientation, in accordance with one embodiment of the present disclosure.
Figure 3B:
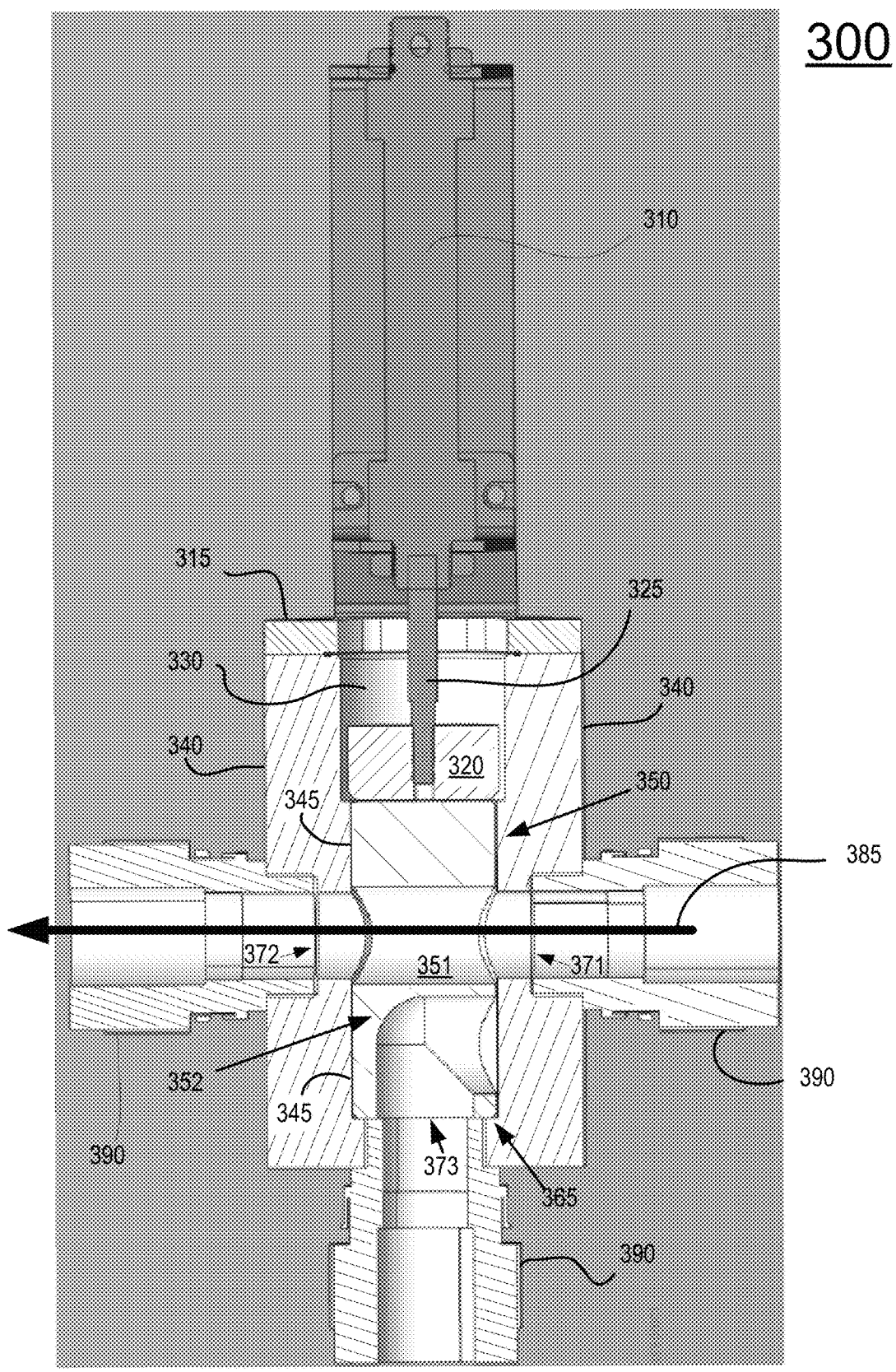
FIG. 3B is a cross-sectional diagram of a three-way piston assembly suitable for use in a process chamber for depositing a film on a wafer, wherein the piston is configured for fluid flowing from an inlet to an outlet via a cross-flow orientation flow path through the piston assembly, in accordance with one embodiment of the present disclosure.

In further embodiments, the catholyte manifold 111 of electroplating cell 300 includes small ports or holes 131 in the catholyte manifold (see FIG. 3B). Holes 131 are configured to deliver catholyte to the catholyte chamber. In some embodiments, the holes are configured to deliver a turbulent flow of catholyte to the catholyte chamber. The holes provide flow restriction to the catholyte manifold thereby allowing for high velocity fluid to enter into the catholyte chamber and mix the fluid therein.

Figure 2:
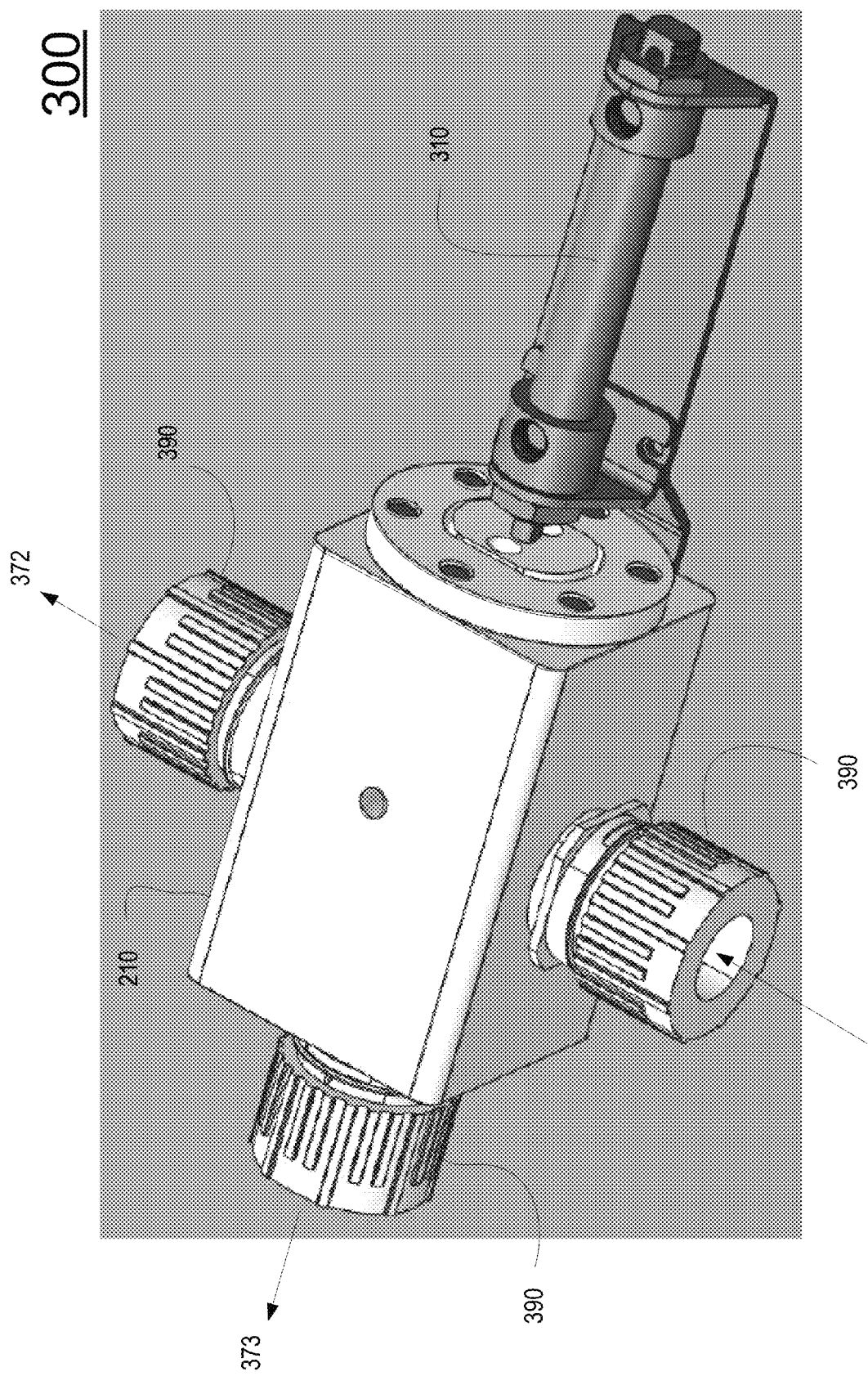
FIG. 2 is a perspective view of a piston assembly suitable for use in a process chamber for depositing a film on a wafer, in accordance with one embodiment of the present disclosure.

FIG. 2 is a perspective view of a piston/valve assembly 300 suitable for use in a process chamber (e.g., electroplating cell) for depositing (e.g., wet deposition) a film on a wafer, in accordance with one embodiment of the present disclosure. The piston/valve assembly 300 is configured as a three-way valve and is configurable for switching liquid chemical flow from an inlet to one or more outlets with a low pressure drop across the valve. In particular, piston assembly 300 may be described as a trumpet-type three-way piston valve, that has a compact design or smaller form-factor when compared to existing pneumatic and servo-motor three-way valves.

As shown, the piston/valve assembly 300 includes housing 210 which contains the piston, as will be described below in relation to FIGS. 3-4. A linear motion actuator 310 is attached to the piston, and selectively drives the piston back and forth along a linear axis. In one embodiment, the linear motion actuator 310 is a pneumatic cylinder, which may be manually controlled or machine controlled. In other embodiments, the linear motion actuator 310 may be servo actuated (e.g., servo motor), implemented using a solenoid or using any other kind of actuator.

In one position, the piston operating as a valve inside housing 210 allows fluid flow from an inlet 371 to outlet 372 in a cross-flow manner, which is the primary flow path. The piston/valve assembly 300 has a very high Cv due to a wide open primary flow path. The primary flow path dominates during the chemical process. In another position, the piston allows fluid flow from the inlet 371 to outlet 373 in an angled manner. For example, the flow path takes an angled turn (e.g., 90 degrees) inside the piston. In one implementation, the outlet 373 provides fluid flow to regions of a catholyte chamber of a process chamber, wherein the regions are located under an HRVA plate. The fluid flow is sufficient to allow proper interaction with the HRVA (e.g., force bubbles through the HRVA plate.

The piston/valve assembly 300 shown in FIG. 2 is configured as a three-way valve, but is convertible to other valve configurations, as will be described in relation to FIGS. 4A-1, 4A-2 and 4B-1 through 4B-3. Briefly, the piston that is driven by the linear motion actuator within a valve body or bore can be swapped without changing the valve body. In that manner, the piston/valve assembly can be configurable for different flow paths depending on which piston is used, and in which position that piston is configured within the piston/valve assembly. In particular, the piston/valve assembly can be configured with 2 or more internal flow paths, such that the piston/valve assembly 300 can be a two-way valve, three-way valve, four-way valve, five-way valve, etc. For example, the piston/valve assembly can be used in multiple use cases, such as switching between high and low flow orifices, fast duty-cycle alternating flow paths, or simply as a two-way valve.

FIG. 3A is a cross-sectional diagram of the three-way piston/valve assembly 300 introduced in FIG. 2 that is suitable for use in a process chamber for depositing a film on a wafer (e.g., wet deposition process), in accordance with one embodiment of the present disclosure. Although the piston/valve assembly 300 is configured as a three-way valve in one embodiment, other embodiments are well suited to piston/valve assemblies as multi-way valves (e.g., two-way valves, or three-way valves, four-way valves, etc.). In particular, the piston/valve assembly 300 is configured for switching liquid chemical flow from an inlet orifice (e.g., port) to one or more outlet orifices (e.g., ports) with a low pressure drop across the internal valve depending on the position of the piston within the piston valve assembly 300. For example, the fluid entering the piston/valve assembly 300 through an inlet is at a higher pressure than within the bore to induce fluid flow from the inlet to one or more outlets.

In one embodiment, the piston/valve assembly 300 is designed for performing at high duty cycles, and upwards of hundreds of cycles per minute.

As shown, the piston/valve assembly 300 includes a linear motion actuator 310. In one implementation, the linear motion actuator or linear drive is a pneumatic cylinder. As previously described, the piston/valve assembly 300 may be driven by any type of actuator including mechanically driven actuators (e.g., servo motor, etc.), and electrically driven actuators (e.g., solenoid, etc.).

The linear motion actuator 310 includes a threaded shaft 325, which is driven in a linear manner, such as along a linear axis 305. The threaded shaft at one end is threaded for purposes of coupling to the piston, described below. In particular, the threaded shaft 325 is coupled to a piston adaptor 320 (threaded into a threaded bore of the piston adaptor). As such, linear movement of the threaded shaft 325 is translated into linear movement of the piston adaptor 320. In one embodiment, the piston adaptor is comprised of polyethylene terephthalate (PET) material. As will be further described below in FIG. 6A, the piston 350 is attached to the piston adaptor 320 via a base 354 of the piston. In that manner, linear movement of the threaded shaft 325 is translated to the piston adaptor 320, which is then translated to the piston 350.

The piston/valve assembly 300 includes a valve body 340 that is configured to surround a bore 345 aligned with linear axis 305. The valve body 340 includes an inlet orifice 371, a first outlet orifice 372, and a second outlet orifice 373. For example, the outlet orifice 372 provides for a cross-flow flow path (not enabled in FIG. 3A). In addition, the outlet orifice 373 provides for an angled flow path (enabled in FIG. 3A), such as flow path 380 including a 90 degree turn within the piston 350.

In addition, the piston/valve assembly 300 includes an internal piston 350 that is positioned within the bore 345 of the valve body 340. The piston 350 includes multiple bores providing internal flow paths through the piston. In particular, piston 350 is fixedly attached to the piston adaptor 320 to allow for back and forth movement with the linear motion of the linear motion actuator 310 between one or more states to align bores or flow paths in the piston with the inlet orifice 371 and one or more of the outlet orifices 371 and 372, in one embodiment. In that manner, the piston 350 is controllably moved through the bore 345 of the valve body 340, such that a flow path through the piston 350 and the piston valve assembly 300 can be selected. For example, the linear motion actuator 310 is adapted to couple with the piston 350 and is further configured to control linear movement of the piston through the bore 345 between a first position and a second position. The coupling between the piston 350 and the piston adaptor 320 is further described in relation to FIGS. 6A-6B below. In another embodiment, the piston 350 is not attached to the piston adaptor 320, as will be further described in relation to FIG. 7. In one implementation, the piston 350 is comprised of polytetrafluoroethylene (PTFE).

The piston 350 includes a base 354, a first section 351 that is adjacent to the base 354, and a second section 352, wherein the first section is configured to have a first internal flow path, and the second section is configured to have a second internal flow path. As shown in FIG. 3A, the second section 352 is configured for an angled flow path orientation when the piston 350 is positioned correctly, and more particularly, when the piston 350 is in the second position the second section 352 of the piston 350 is aligned with the inlet orifice 371 such that fluid flows from the inlet orifice to the second outlet (e.g., outlet orifice 373) via the second internal flow path. More specifically, linear motion actuator 310 is in a retracted state, such as a fully retracted state. As such, the piston 350 is pulled back (as translated through the piston adaptor 320) within the bore 345 to expose the open chamber region 360 of the bore 345 formed with the piston 350. On the other hand, when the piston 350 is in a fully extended state, the chamber region 360 may be closed, as that shown in FIG. 3B. The piston 350 is internally configured for an angled fluid flow, such as through the elbow of the second section 352. As a result, fluid flowing from the inlet orifice 371 from the interface 390 (e.g., coupler) follows the 90 degree angled flow path within piston 350 (e.g., through elbow), enters the open chamber 360, and exits the piston/valve assembly 300 at exit orifice 373 and through interface 390. The angled orientation flow path 380 through the piston/valve assembly 300 is shown entering at inlet orifice 371 and exiting at outlet orifice 373. That is, the piston/valve assembly 300 is configured for fluid flowing from inlet orifice 371 to the outlet orifice 373 via a ninety-degree angled flow path 380 through the piston 350, as shown. For example, the flow path 380 may be of a HRVA flow orientation, such that fluid is transported into the processing chamber (e.g., the catholyte chamber including regions under an HRVA plate). Embodiments of the disclosure support any angle for the flow path, and in any direction through the body of the piston 350. In one implementation, at least one of the first outlet orifice 372 and second outlet orifice 373 configured for exiting into the process chamber. In one implementation, the valve body 340 is comprised of polypropylene or natural polypropylene.

The first section 351 is configured for a cross-flow orientation when the piston 350 is positioned correctly, as shown in FIG. 3B, which is a cross-sectional diagram of the three-way piston/valve assembly 300 suitable for use in a process chamber for depositing a film on a wafer (e.g., wet deposition), in accordance with one embodiment of the present disclosure. In particular, when the piston 350 is in the first position, the first section 351 of the piston is aligned with the inlet orifice 371, such that fluid flows from the inlet orifice to the first outlet orifice (e.g., outlet orifice 372) via the first internal flow path. As shown, piston 350 is in a fully extended state. As such, the piston is pushed through (as translated through the piston adaptor 320)) within the bore 345, such that the open chamber region 360 is more or less closed. For example, the piston 350 may be resting on the lip 365 of the bore 345, thereby closing off the chamber region 360. The piston 350 is internally configured for a cross fluid flow (crossing from one side to another without significant turns), such as through first section 351. As a result, fluid flowing from the inlet orifice 371 from the interface 390 follows the cross-flow flow path within piston 350, and exits the piston/valve assembly 300 at exit orifice 372 and through another interface 390. The cross-flow orientation flow path 385 through the piston/valve assembly 300 is shown entering at inlet orifice 371 and existing at outlet orifice 372.

Further shown in FIGS. 3A-3B is a diaphragm clamp 315, which is fixedly attached to the valve body 340. The diaphragm clamp 315 is configured to secure a diaphragm 330 to the valve body 340 in such a manner to prevent fluid flowing within the piston 350 from passing through the bore 345 and out to the exterior of the piston valve assembly (e.g., towards the linear motion actuator 310). The diaphragm 330 is a seal located between the piston and a surface of the bore, wherein the seal is configured to prevent fluid from passing from the bore through a first end of the bore in the valve body 340, wherein the linear motion actuator 310 is coupled to the piston 350 through the first end of the bore. That is, the flow of the fluid is restricted to enter the inlet orifice 371 and only exit through one of the exit orifices 372 or 373, as shown in FIGS. 3A-3B. In one implementation, the diaphragm clamp 315 is comprised of PET. In one embodiment, the diaphragm 330 is a rolling diaphragm, and may be comprised of synthetic rubber and fluoropolymer elastomer (e.g., Viton®). In another embodiment, the seal is an O-ring, such that the diaphragm is replaced with the O-ring.

In one embodiment, the piston/valve assembly is convertible to other valve configurations. In particular, by swapping or switching the pistons (e.g., each having different internal bores defining flow paths) along with a suitable valve body, then a different set of flow paths through the piston body and through the piston/valve assembly 300 can be achieved depending on which piston is installed within the piston/valve assembly. In particular, FIGS. 4A-1, 4A-2 and 4B-1 through 4B-3 include diagrams of a multi-way piston/valve assembly that is convertible to provide different sets of flow paths through the piston/valve assembly depending on which piston (and corresponding internal flow paths) is selected for use in the same valve body, in accordance with embodiments of the present disclosure.

In particular, FIGS. 4A-1 and 4A-2 are cross-sectional diagrams of a three-way piston valve assembly 400A that is suitable for use in a process chamber (e.g., electroplating chamber) for depositing a film on a wafer (e.g., through wet deposition processes), and that is convertible to a multi-way piston/valve assembly 400B (of FIGS. 4B-1 through 4B-3) by switching the piston within the assembly but retaining the same valve body and other components, in accordance with one embodiment of the present disclosure. In particular, the piston/valve assembly 400A is configured for switching liquid chemical flow from an inlet orifice (e.g., port) to one or more outlet orifices (e.g., ports) with a low pressure drop across the internal valve depending on the position of the piston within the piston/valve assembly 400A.

The piston/valve assembly 400A functions identically to the piston valve assembly 300 of FIGS. 3A-3B because of the selected piston 450-1. In particular, the piston/valve assembly 400A includes the linear motion actuator 310, which also includes the threaded shaft 325, which is driven in a linear manner, such as along a linear axis 405. Further, threaded shaft 325 is coupled to piston adaptor 320, as previously described, such that linear movement of the threaded shaft 325 is translated into linear movement of the piston adaptor 320.

Piston 450-1 is attached to the piston adaptor 320 via a base of the piston, in one embodiment. In another embodiment, the piston 450-1 engages with the piston adaptor for linear movement in one direction, and with another force (e.g., provided by a spring) for movement in the opposite direction, as will be described below in relation to FIG. 7. In both cases, linear movement of the threaded shaft 325 is translated to the piston adaptor 320, which is then translated to piston 450-1, which moves through a bore 445 of a valve body 440.

More particularly, valve body 440 is configured to surround a bore 445 that is aligned with the linear axis 405. The valve body 440 includes an inlet orifice 371' and a plurality of outlet orifices. For example, the outlets may include outlet orifice 372', orifice 373', and orifice 470. Selection of outlet orifices for flow paths depends on which piston is engaged with the valve body 440. For example, piston 450-1 of piston/valve assembly 400A provides access to a set of outlets including outlet orifices 372' and 373', while piston 450-2 of piston/valve assembly 400B of FIGS. 4B-1 through 4B-3 provides access to a different set of outlets including outlet orifices 372', 373', and 470.

As shown in the piston/valve assembly 400A of FIGS. 4A-1 and 4A-2, the outlet orifice 470 is not accessible by the bores of piston 450-1, and effectively piston/valve assembly 400A functions similarly as the piston/valve assembly 300 of FIGS. 3A-3B. That is, piston 450 is positioned within bore 445 of valve body 440, and includes multiple bores 351' and 352' providing internal flow paths through piston 450-1. The piston 450-1 is controllably moved through the bore 445 of valve body 440 to align bores or flow paths in the piston 450-1 with the inlet orifice 371' and one or more of the outlet orifices 372' and 373'. Note that the piston 450-1 does not align with the outlet orifice 470. For example, when the piston 450-1 is in a first position (as shown in FIG. 4A-1)), the bore 351' is aligned with the inlet orifice 371' and the outlet orifice 373' to provide an angled flow path (e.g., angled turn of 90 degrees through the elbow to provide for an HRVA flow orientation) through the piston/valve assembly 400A, similar to the alignment of the piston/valve assembly 300 of FIG. 3A. Also, when the piston 450-1 is in a second position (as shown in FIG. 4A-2), the bore 352' is aligned with the inlet orifice 371' and the outlet orifice 372' to provide a cross-flow flow path through the piston/valve assembly 400A (e.g., without any substantial angling in the path through the piston/valve assembly), similar to the alignment of the piston/valve assembly 300 of FIG. 3B.

The piston/valve assembly 400A is convertible to multi-way piston/valve assembly 400B by switching to piston 450-2 for use within the same valve body 440, as well as other components (e.g., linear motion actuator 310, piston adaptor 320, etc.). In particular, piston/valve assembly 400B includes the same valve body 440 that is configured to surround bore 445 that is aligned with linear axis 405, wherein the valve body 440 includes the inlet orifice 371' and a plurality of outlet orifices (e.g., 372', 373', and 470). In addition, piston 450-2 is controllably positioned within the valve body 440 to align bores or flow paths in piston 450-2 with inlet orifice 371' and one or more of the outlet orifices (the full set) 372', 373', and 470, as will be shown in each of FIGS. 4B-1 through 4B-3.

Figures 1, 4B:
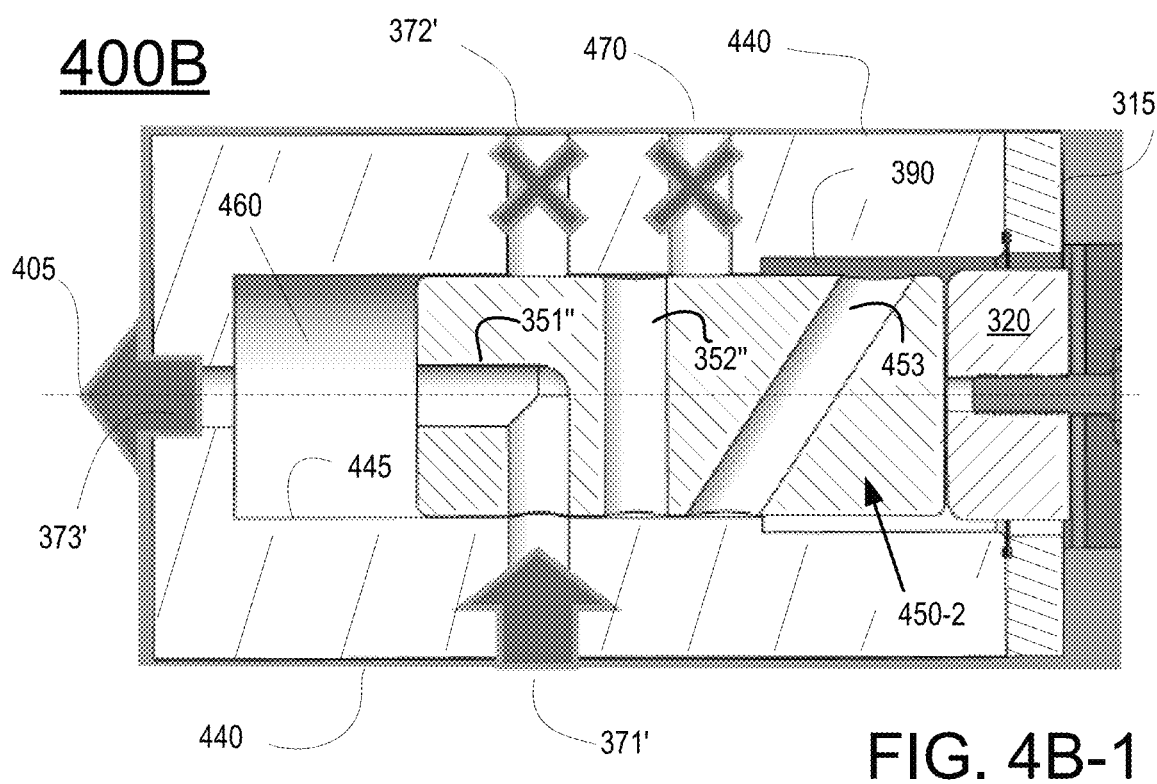
Figures 2, 4B:
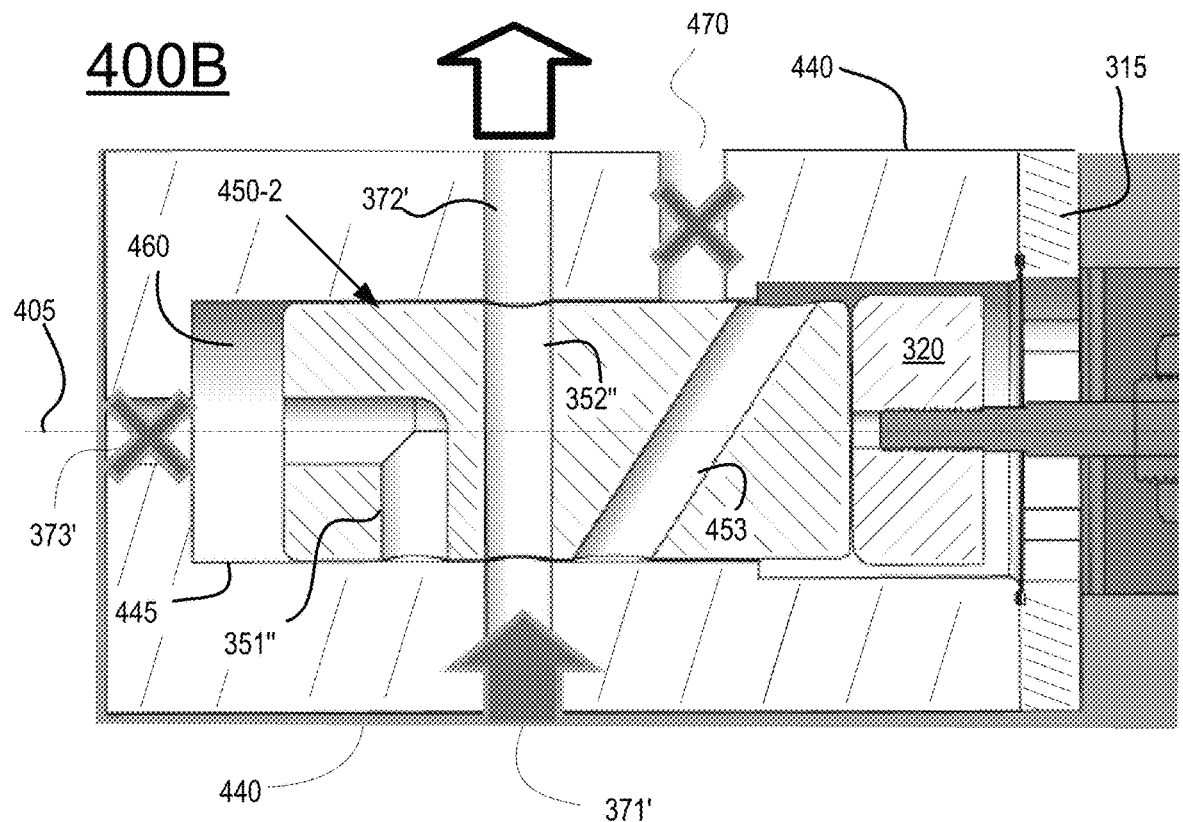

In particular, FIG. 4B-1 is a cross-sectional diagram of the multi-way (e.g., four-way) piston/valve assembly 400B suitable for use in a process chamber for depositing a film on a wafer, wherein the piston 450-2 is positioned to provide an angled flow path, such as in an HRVA flow orientation, in accordance with one embodiment of the present disclosure. Specifically, when the piston 450-2 is in a first position, the bore 351" is aligned with the inlet orifice 371' and outlet orifice 373' to provide for an angled flow path (e.g., angled turn of 90 degrees through the elbow to provide for an HRVA flow orientation) through the piston/valve assembly 400B, similar to the alignment of the piston/valve assembly 300 of FIG. 3A.

FIG. 4B-2 is a cross-sectional diagram of the multi-way (e.g., four-way) piston/valve assembly 400B suitable for use in a process chamber for depositing a film on a wafer, wherein the piston 450-2 is configured for fluid flowing from an inlet to an outlet via a cross-flow orientation flow path through the piston assembly, in accordance with one embodiment of the present disclosure. Specifically, when the piston 450-2 is in a second position, the bore 352" is aligned with the inlet orifice 371' and the outlet orifice 372' to provide for a cross-flow flow path through piston/valve assembly 400B, similar to the alignment of the piston/valve assembly 300 of FIG. 3B.

Figures 3, 4B:
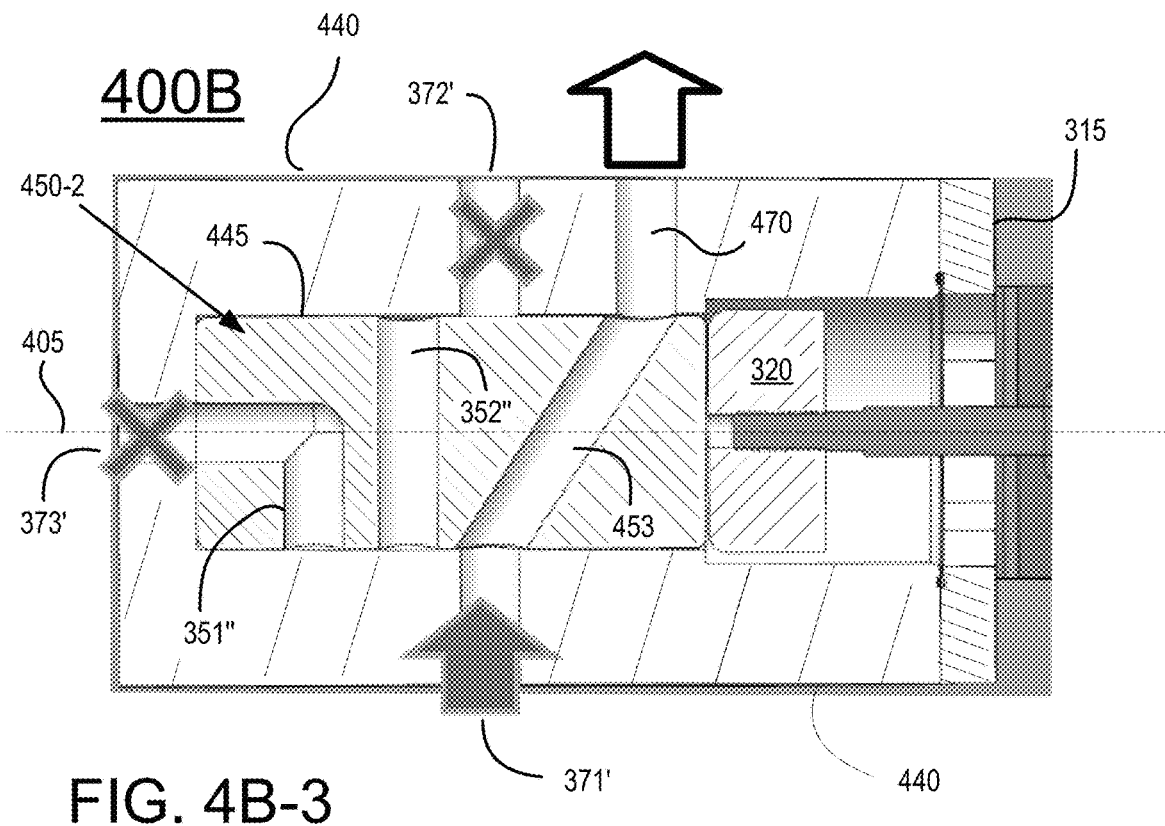

FIG. 4B-3 is a cross-sectional diagram of the multi-way (e.g., four-way) piston assembly suitable for use in a process chamber for depositing a film on a wafer, wherein the piston 450-2 is configured for fluid flowing from an inlet to an outlet via an angled flow path through the piston assembly, wherein the angled flow path may be an HRVA flow orientation, in accordance with one embodiment of the present disclosure. Specifically, when the piston 450-2 is controllably moved to a third position through motion of the linear motion actuator, the bore 453 is aligned with the inlet orifice 371' and the outlet orifice 470 to provide for an angled flow path through the piston valve assembly 400B.

FIGS. 4B-1 through 4B-3 illustrate examples of multiple flow paths, wherein the flow paths are shown to be in the same plane, for illustration purposes only. Of course, in other embodiments the flow paths could include paths into and out of the cross sections shown in FIGS. 4B-1 through 4B-3. That is, flow paths are not required to be parallel to the same plane.

Figure 5:
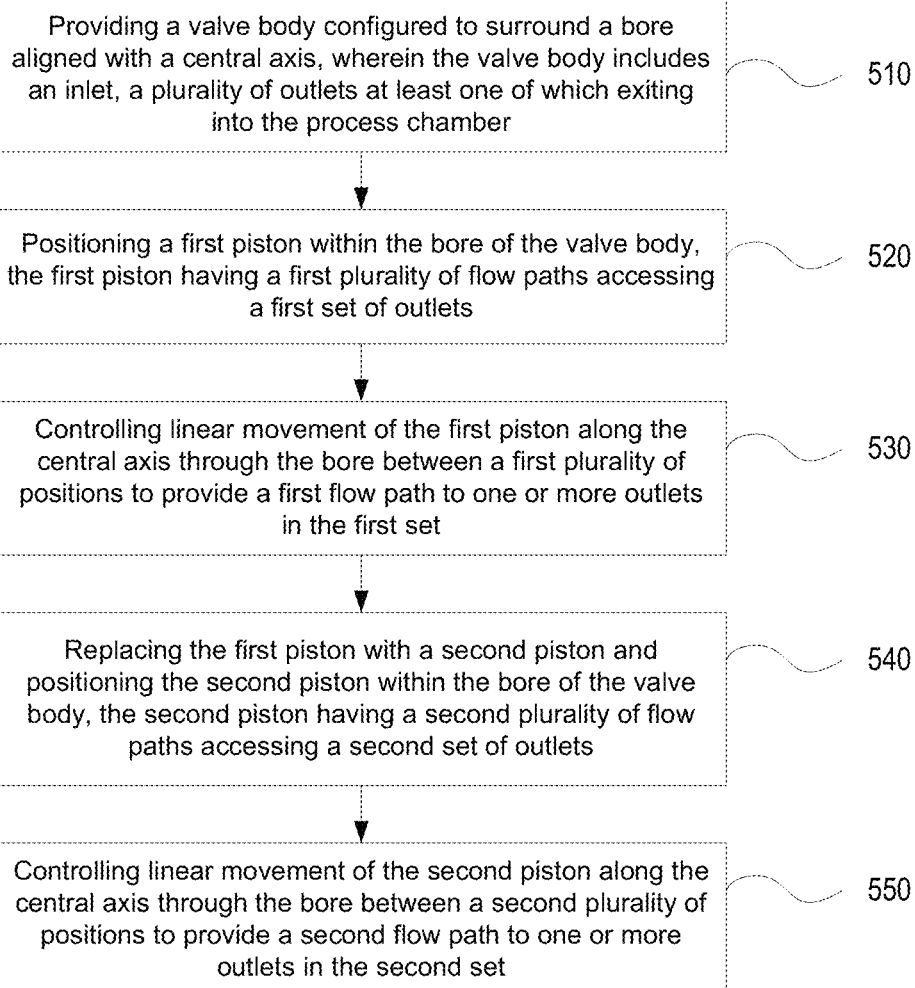
FIG. 5 is a flow diagram illustrating a method for switching between flow paths using a multi-way piston assembly suitable for use with a process chamber for depositing a film on a wafer, in accordance with one embodiment of the present disclosure.

With the detailed description of the various modules of the processing system 100A and piston/valve assemblies 300, 400A, and 400B, flow diagram 500 of FIG. 5 illustrates a method for switching between flow paths using a multi-way piston assembly suitable for use with a process chamber (e.g., electroplating cell) for depositing a film on a wafer (e.g., wet deposition), in accordance with one embodiment of the present disclosure. In particular, flow paths are selectable depending on which piston is used, wherein each piston has a corresponding internal set of flow paths that provide access to a corresponding set of outlet orifices. For example, the flow diagram 500 may be implemented using the pivot valve assemblies 400A-400B of FIGS. 4A-1, 4A-2 and 4B-1 through 4B-3.

At 510, the method includes providing a valve body in the piston/valve assembly, wherein the valve body is configured to surround a bore aligned with a central axis, wherein the valve body includes an inlet, a plurality of outlets at least one of which exiting into the process chamber.

Different sets of outlets are accessed depending on which piston body is used, as described below. For example, a first piston includes a first plurality of internal flow paths that provide access to one or more of a first set of outlets. In addition, a second piston includes a second plurality of internal flow paths that provide access to one or more of a second set of outlets.

At 520, the method includes positioning a first piston within the bore of the valve body, wherein the first piston accesses one or more of the first set of outlets. At 530, the method includes controlling linear movement of the first piston along the central axis between a first plurality of positions to provide a first flow path between the inlet and one or more outlets in the first set of outlets. Linear movement is provided through a linear motion actuator that is adapted to couple with the first piston. For example, in a first position, the first piston is aligned with the inlet such that fluid flows from the inlet to a first outlet via a first flow path, and in a second position the first piston is aligned with the inlet such that fluid flows from the inlet to a second outlet via a second flow path. In addition, in another embodiment, in a third position, the first piston is aligned with the inlet such that fluid flows from the inlet to a third outlet via a third flow path. Further, in still another embodiment, in a fourth position the piston is aligned with the inlet such that fluid flows from the inlet to two or more outlets via two or more corresponding outlet paths.

At 540, the method includes replacing the first piston with the second piston, and positioning the second piston within the bore of the valve body, wherein the second piston accesses one or more of the second set of outlets. At 550, the method includes controlling linear movement of the second piston along the central axis between a second plurality of positions to provide a second flow path between the inlet and one or more outlets in the second set of outlets. Linear movement is provided through the linear motion actuator that is adapted to couple with the second piston.

Figure 6A:
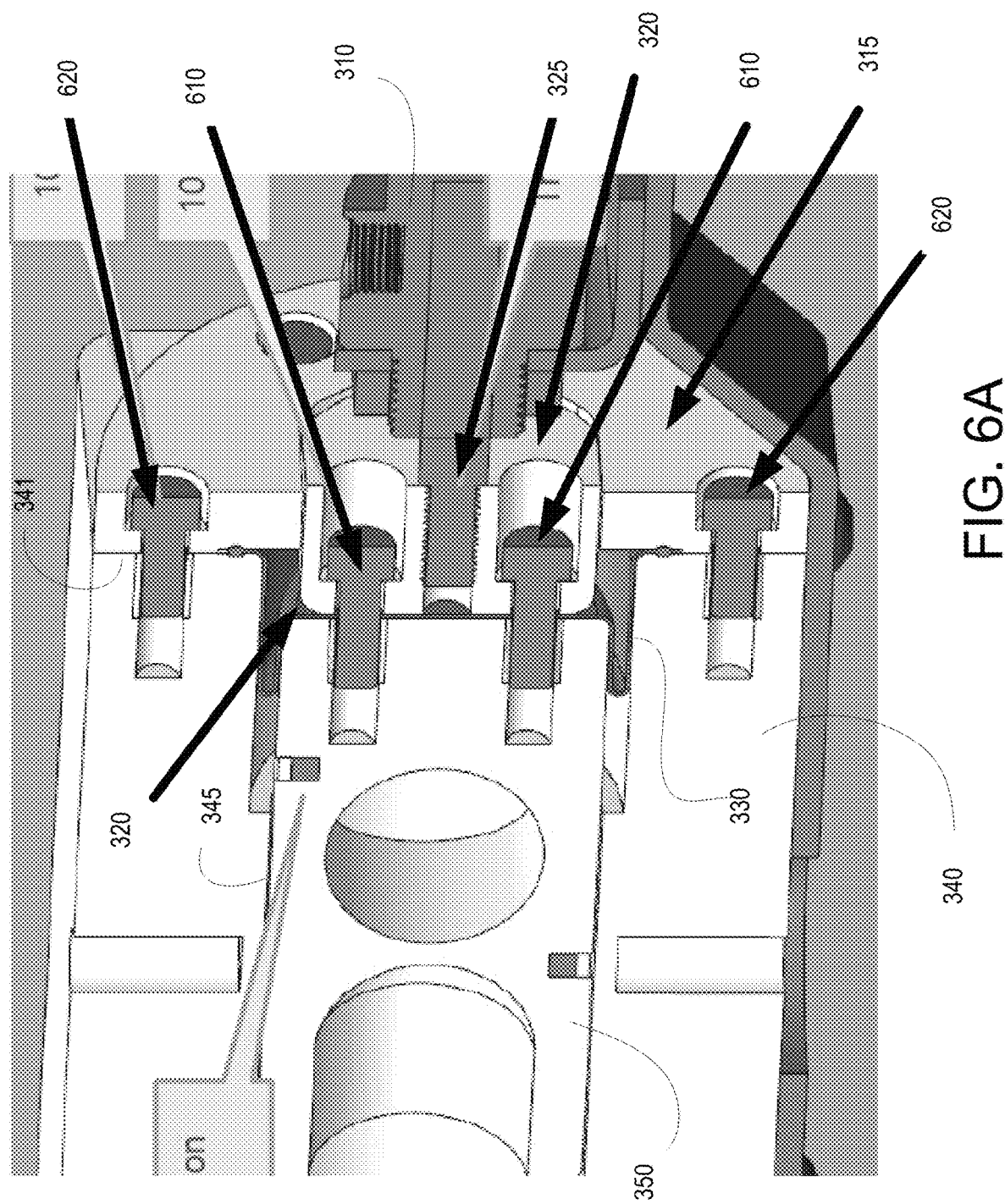
FIG. 6A is a perspective view of an interfacing between a piston adaptor and a three-way or multi-way piston assembly of FIGS. 5A-5B that is suitable for use in a process chamber for depositing a film on a wafer, wherein the piston adaptor is fixedly attached to a linear motion actuator, in accordance with one embodiment of the present disclosure.

FIG. 6A is a perspective view of an interfacing between a piston adaptor and a three-way piston/valve assembly 300 of FIGS. 3A-3B suitable for use in a process chamber for depositing a film on a wafer, in accordance with one embodiment of the present disclosure. Of course, the interfacing described in FIG. 6A is suitable for use in the piston/valve assembly 400A and 400B of FIGS. 4A-1, 4A-2 and 4B-1 through 4B-3, in other embodiments.

In particular, the piston adaptor 320 is fixedly attached to a linear motion actuator 310 through any suitable attaching mechanism, such as through the threaded shaft 325. In addition, the piston adaptor 320 is fixedly attached to the piston 350 through any suitable attaching mechanism. For example, screws 610 may be used to fixedly attach the piston adaptor to the piston 350. For illustration, screws 610 may be of dimension—10-24×½" (inch). In that manner, because of the fixed attachment between the piston adaptor 320 and the piston 350, as the piston adaptor 320 moves, so does the piston 350. As shown, the piston 350 is positioned within the bore 345 of the valve body 340. As such, linear movement of the linear motion actuator through the threaded shaft 325 translates to linear movement of the piston adaptor 320, and further translates to linear movement of the piston 350.

In addition, FIG. 6A provides a close-up view of the diaphragm 330, which is configured to prevent fluid flow to the exterior of the piston/valve assembly 300 (e.g., out from the bore 345 and internal bores or flow paths of piston 350 towards the linear motion actuator 310). In particular, the outer edge 635 of diaphragm 330 is positioned between a top surface 341 of the valve body 340 and the diaphragm clamp 315. Further, to lock the diaphragm in place, diaphragm clamp 315 is fixedly attached to the valve body 340 and squeezing the outer edge 635 of the diaphragm 330 between the two through any suitable attaching mechanism, such as screws 620. For illustration, screws 620 may be of dimension—10-24×½" (inch).

Figure 6B:
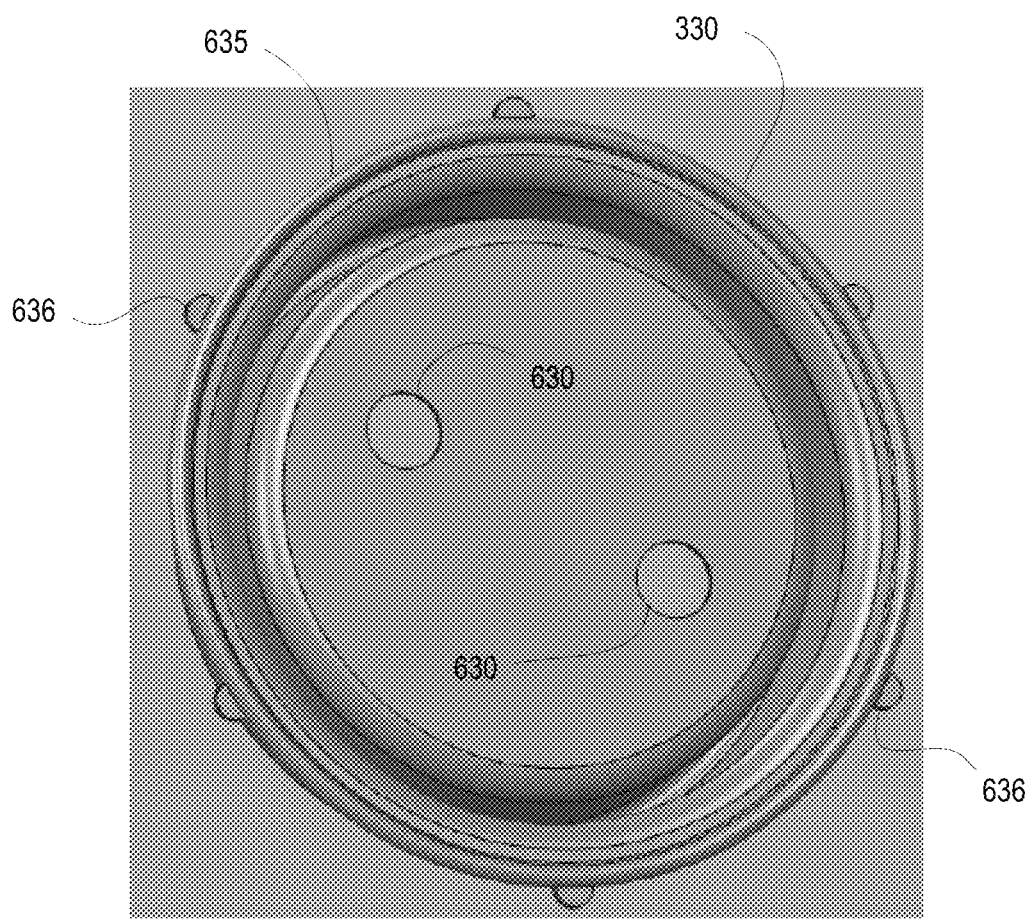
FIG. 6B is a perspective view of a diaphragm configured for use in the interfacing between a piston adaptor and a three-way or multi-way piston assembly of FIG. 7A, in accordance with one embodiment of the present disclosure.

Diaphragm 330 is a rolling diaphragm, though other types of diaphragms may be used in other embodiments. In particular, FIG. 6B is a perspective view of the rolling diaphragm 330 configured for use in the interfacing between the piston adaptor 330, a piston 350, valve body 340 and the diaphragm clamp 315, in accordance with one embodiment of the present disclosure. Holes 630 allow access by screws 620 to reach through to the piston 350, but are designed such that once the piston adaptor 320 is fixedly attached to the piston 350 no leakage can occur through the diaphragm through holes 630. In one implementation, the rolling diaphragm is made from a PET fabric with a Viton® coating. In another embodiment, the diaphragm 330 includes clocking features 636 that may be used to ensure the piston 350 is properly installed. In still another embodiment, the sealing function performed by the diaphragm may be performed using an O-ring. In one implementation, the diaphragm 330 is rated for continuous use in chemistry for at least thirty-thousand cycles. For example, a cycle may include fully extending (rolling out) the diaphragm (e.g., approximately to a 1.125" stroke range that corresponds to linear movement of the piston 350) (see FIG. 3B), and then allowing the diaphragm to retract (roll up) to its default state (see FIG. 3A).

Figure 7:
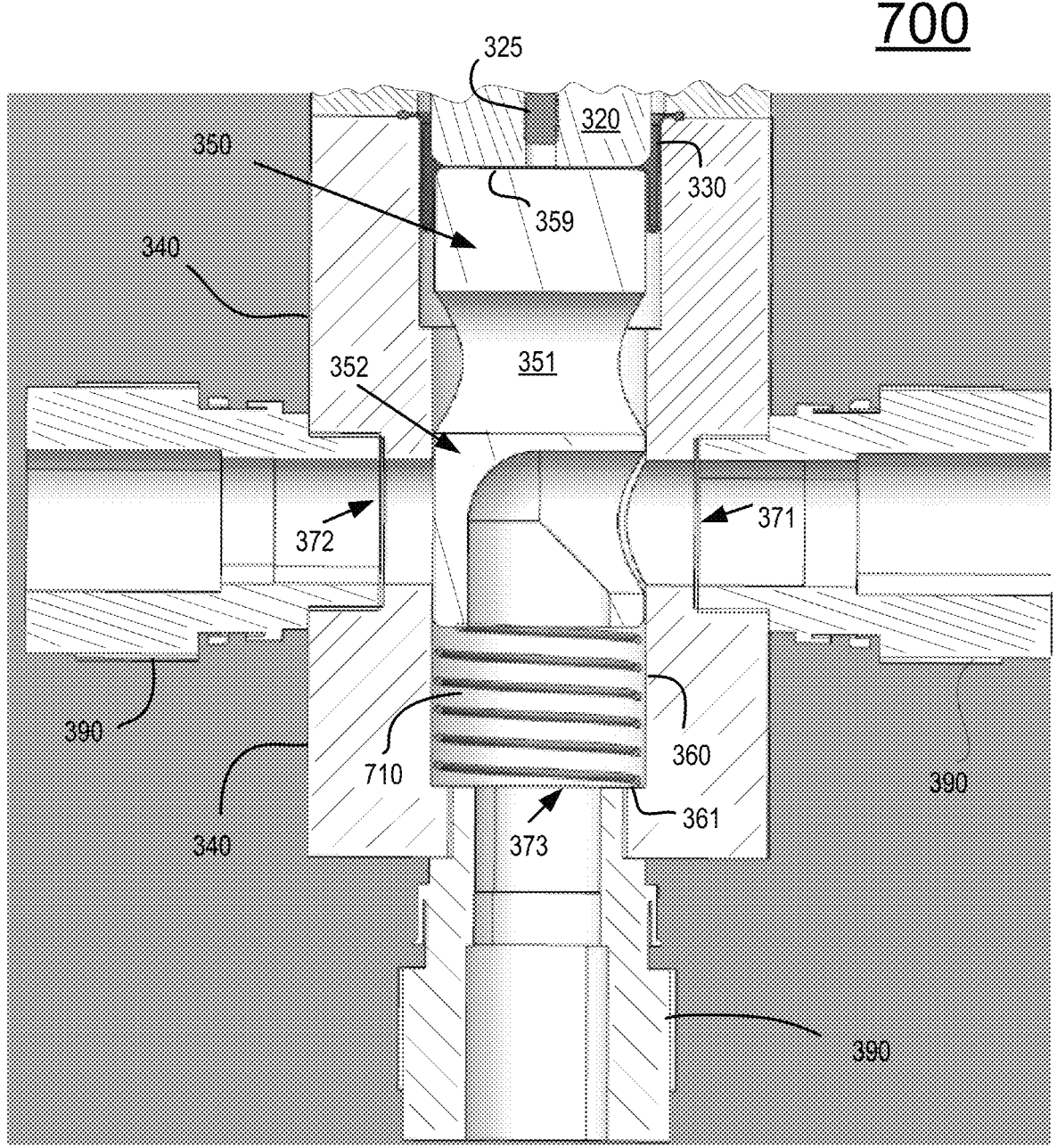
FIG. 7 is a cross-sectional diagram of a three-way piston assembly suitable for use in a process chamber for depositing a film on a wafer, and including a spring return used with a single-acting linear motion actuator that pushes a piston in the piston assembly as the linear motion actuator retracts, in accordance with one embodiment of the present disclosure.

FIG. 7 is a cross-sectional diagram of a three-way piston/valve assembly 700 suitable for use in a process chamber for depositing a film on a wafer, and including a spring return used with a single-acting linear motion actuator that pushes a piston in the piston assembly as the linear motion actuator retracts, in accordance with one embodiment of the present disclosure.

The piston/valve assembly 700 is similar to the piston/valve assembly 300 of FIGS. 3A-3B, except that the piston 350 is not fixedly attached to the piston adaptor 320. For example, piston/valve assembly 700 does not have the attaching mechanism shown in FIG. 6A (e.g., screws 610) that attach the piston adaptor 320 to the piston 350. In contrast, the piston adaptor 320 of the piston/valve assembly 300 actively engages with the piston 350 to provide linear movement in both directions. That is, as the linear motion actuator 310 extends out, the piston adaptor 320 pushes the piston 350 through the bore 345 of the valve body 340 (see FIG. 3A). Also, as the linear motion actuator 310 retracts, the piston adaptor 320 actively pulls the piston 350 back through the bore 345 (see FIG. 3B).

On the other hand, because the piston adaptor 320 is not fixedly attached to the piston 350 in the piston/valve assembly 700 of FIG. 7, the piston adaptor 320 passively engages with the piston 350 only in one direction. For example, as the linear motion actuator 310 extends out, the piston adaptor 320 contacts the piston 350 and pushes the piston through the bore 345 of the valve body 340 (see FIG. 3A). However, as the linear motion actuator 310 retracts, because the piston adaptor 320 is not fixedly attached to the piston 350, the piston 350 is not actively pulled back through the bore. That is, the linear motion actuator 310 provides a single-acting actuation. In that case, the spring 710 provides for the return of the piston 350 back to a default state (e.g., top surface 359 of piston 350 contacting the piston adaptor 320 via the diaphragm 330). As shown, spring 710 sits within the cavity 360 of the bore 345, and rests on lip 361.

Figure 8A:
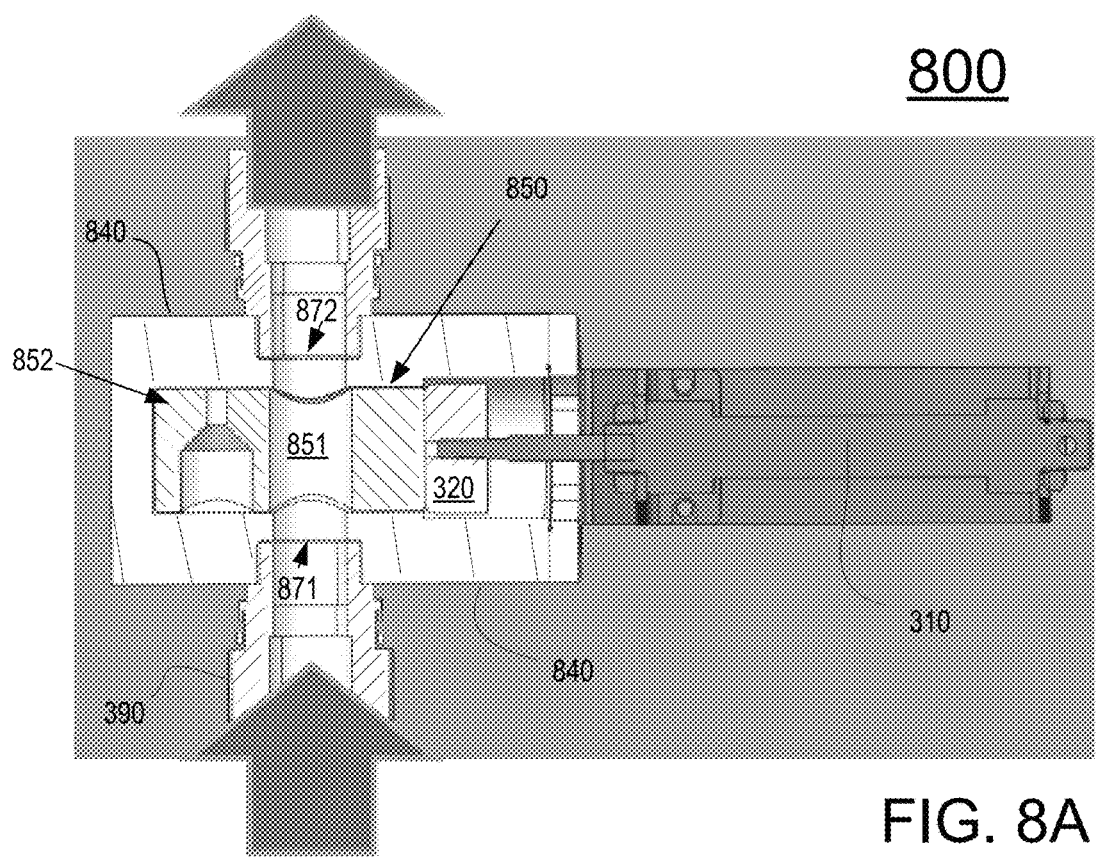
FIGS. 8A-8B are cross-sectional diagrams of a two-way piston assembly suitable for use in a process chamber for depositing a film on a wafer, and configured to have low and high flow paths depending on the internal configuration of the piston assembly, in accordance with one embodiment of the present disclosure.
Figure 8B:
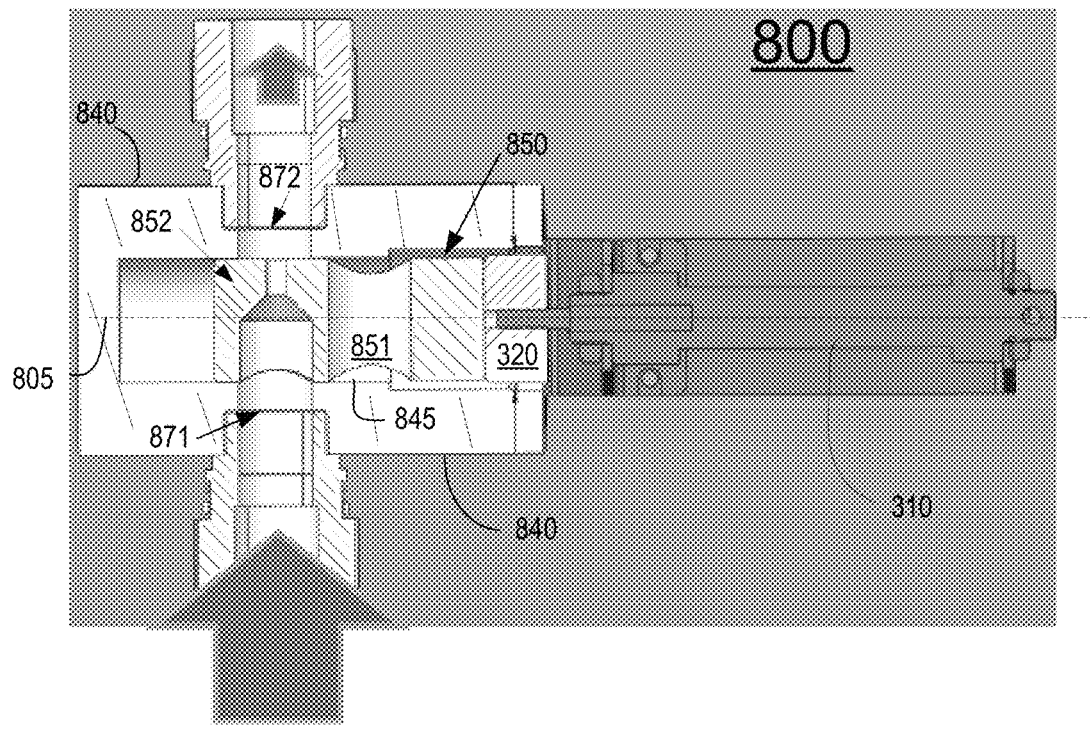

FIGS. 8A-8B are cross-sectional diagrams of a two-way piston/valve assembly 800 suitable for use in a process chamber (e.g., electroplating cell) for depositing a film on a wafer (e.g., wet deposition), and configured to have low and high flow paths depending on the internal configuration of the piston/valve assembly, in accordance with one embodiment of the present disclosure. In particular, the piston/valve assembly 800 is shown as a two-way configuration, wherein the piston 850 switches positions between two orifice flow paths, each of which is a cross-flow orientation through the piston 850. In particular, the piston/valve assembly 800 is configured for switching liquid chemical flow from an inlet orifice 871 to a single outlet orifice 872 with a low pressure drop across the internal valve depending on the position of the piston 850 within the piston/valve assembly 800.

The piston/valve assembly 800 includes a linear motion actuator 310, as previously described. The linear motion actuator 310 provides motion along a linear axis 805. The linear motion of the actuator 310 is translated to the piston 850, as previously described in relation to piston valve assemblies 300 and 400A-400B (e.g., through a threaded shaft and piston adaptor 320).

The piston/valve assembly 800 includes a valve body 840 configured to surround a bore 845 aligned with the linear axis 805. The valve body 840 includes an inlet orifice 871 and an outlet orifice 872. The outlet orifice 872 provides a cross-flow flow path through the piston 840, and through the piston/valve assembly 800.

In addition, the piston/valve assembly 800 includes a piston 850 that is positioned within the bore 845 of the valve body 840, and includes multiple bores providing internal flow paths through the piston 850. In particular, the piston 850 includes a first section 851 and a second section 852. The first section 851 is configured to have a first flow path of high flow, and the second section 852 is configured to have a second flow path of low flow. As previously described, the piston 850 is adaptively coupled to (e.g., fixedly or through contact) the linear motion actuator 310 that is configured to control linear movement of the piston 850 through the bore 845 between a first position and a second position. In that manner, piston 850 is controllably moved through bore 845 of valve body 940 to select between two flow paths. For example, when the piston 840 is in a first position, the first section 851 is aligned with the inlet orifice 871 and the outlet orifice 872, such that fluid flows via a high flow path (e.g., the primary process flow path), as is shown in FIG. 8A. Further, when the piston 840 is in a second position, the second section 852 is aligned with the inlet orifice 871 and the outlet orifice 872, such that fluid flow via a low flow path (e.g., the secondary process flow path as in the HRVA flow orientation). For example, the second section 852 may include a reducer to restrict the amount of flow of fluid between the inlet orifice 871 and the outlet orifice 872. In one embodiment, various other pistons can be used (e.g., other than piston 850) to provide different reducing pistons for tuning flow rates through the piston/valve assembly 800 without having to replace the valve body 840 or installing separate restrictor hardware. For example, various pistons can be installed within valve body 840, each piston having different sizes of reducing pistons, with the different sizes having different flow rates. In that manner, piston/valve assembly 800 is not limited to the two flow rates (e.g., full and reduced) shown in FIGS. 8A-8B, but could be configured with one or more selectable flow rates depending on which piston is installed within valve body 840.

Figure 9A:
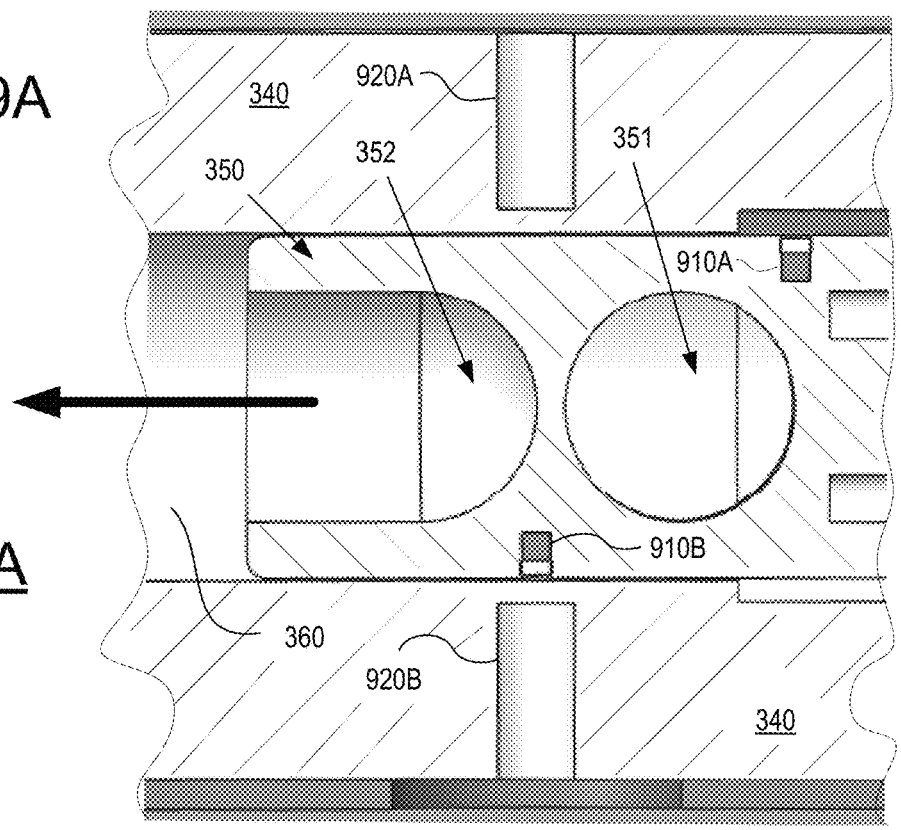
FIG. 9A illustrates a three-way piston assembly suitable for use in a process chamber for depositing a film on a wafer, wherein the piston assembly includes positioning sensors and corresponding magnets for determining states of the piston assembly including a state showing a piston assembly configured for fluid flowing from an inlet to an outlet via a ninety-degree angled flow path through the piston assembly, wherein the angled flow path may be an HRVA flow orientation, in accordance with one embodiment of the present disclosure.
Figure 9B:
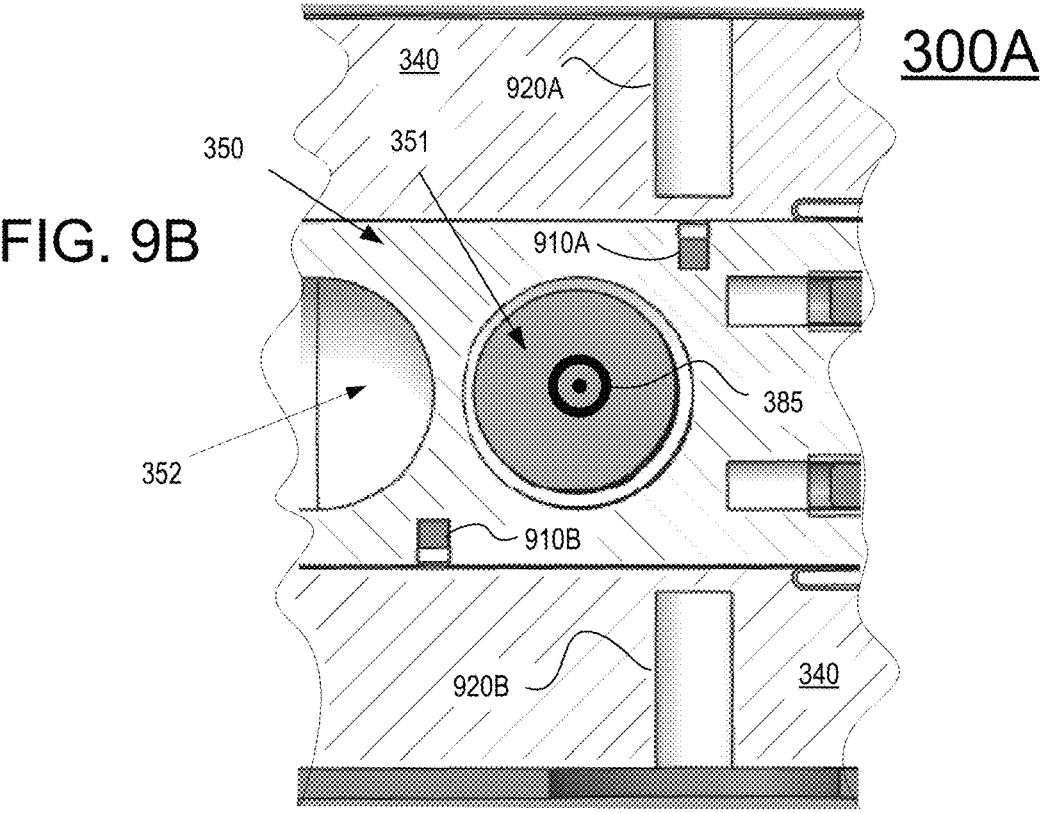
FIG. 9B illustrates a three-way piston assembly suitable for use in a process chamber for depositing a film on a wafer, wherein the piston assembly includes positioning sensors and corresponding magnets for determining states of the piston assembly sensor including a state showing a cross-flow orientation flow path through the piston assembly for fluid flow flowing from an inlet to an outlet, in accordance with one embodiment of the present disclosure.

FIGS. 9A-9B illustrates a three-way piston assembly 300A suitable for use in a process chamber (e.g., electroplating cell) for depositing a film on a wafer (e.g., wet deposition), wherein various internal states of the assembly 300A may be determined through positioning sensors and corresponding magnets, in accordance with one embodiment of the present disclosure. The piston/valve assembly 300A is similar to the piston/valve assembly 300 of FIGS. 3A-3B, except for the addition of the positioning sensors and corresponding magnets for determining state. For example, the piston/valve assembly 300A is configured for switching liquid chemical flow from an inlet orifice (e.g., port) to one or more outlet orifices (e.g., ports) with a low pressure drop across the internal valve depending on the position of the piston within the piston valve assembly 300A, and which piston is used within the piston/valve assembly.

In particular, the piston/valve assembly 300A includes a multi-factor sensor system including positioning sensors and corresponding magnets for detecting piston state. In one embodiment, the multi-factor sensor system includes a plurality of magnets 910 at a plurality of locations in the piston 350. Purely for illustration, magnets 910 may be neodymium magnets that are embedded into the piston 350 (e.g., potted with plug and epoxy). In addition, the multi-factor sensor system includes a plurality of magnetic sensors 920 at a plurality of locations in the valve body 340 configured to pick up or detect a corresponding magnet when properly positioned with respect to each other. In one implementation, the magnets may be short-range hall effect sensors used for detecting corresponding magnets at various states of the piston/valve assembly 300A. For example, the sensors may have characteristics including a 24V DC, 0.8 A stainless steel sensor having a 0.2" detection range. In one implementation, each of the sensors is configured to align with a corresponding magnet to determine state, such that when aligned a corresponding magnet and sensor pair indicates the piston is moved to a corresponding position such that fluid flows from the inlet to one or more outlets via one or more corresponding outlet paths.

In the two-factor sensor system, information from both sensors combined indicate a state of the piston/valve assembly 300A and a corresponding flow path. In particular, as is shown in FIG. 9A the piston/valve assembly 300A is configured for fluid flowing from an inlet (not shown) to an outlet (not shown) through a ninety-degree angled flow path 380 via second section 352 (including the elbow) (see also FIG. 3A). For example, the flow path 380 may perform an HRVA flow orientation. The sensors can indicate that the fluid is flowing through the angled glow path 380. In particular, as is shown in FIG. 9A in the HRVA flow orientation, the top sensor 920A is not aligned with and therefore not sensing or detecting the corresponding top magnet 910A. As such, the top sensor 920A may be in an OFF position. On the other hand, the bottom sensor 920B is aligned with and therefore does detect the corresponding bottom magnet 910B. As such, the bottom sensor may be in an ON position.

As is shown in FIG. 9B, the piston/valve assembly 300A is configured for fluid flowing from the inlet (not shown) to an outlet (not shown) in a cross-flow flow path 385 (see also FIG. 3B). For example, the cross-flow orientation may be the primary flow path through the piston/valve assembly 300 for fluid flow flowing from an inlet to an outlet, in accordance with one embodiment of the present disclosure. In the cross-flow orientation, the top sensor 920A is aligned with and therefore detecting the corresponding top magnet 910A. As such, the top sensor may be in an ON position. On the other hand, the bottom sensor 920B is not aligned with and thereover not sensing or detecting the corresponding bottom magnet 910B. As such, the bottom sensor may be in an OFF position.

The two-factor sensor system builds in redundancy for state detection, and is therefore more accurate (e.g., less false readings). That is, both sensors need to be in particular position (e.g., state or reading) in order to determine state of the piston/valve assembly 300A. If not in a recognized position (e.g., state or reading) for the sensor, then an error state for the piston/valve assembly 300A is indicated (e.g., the piston 350 is not aligned within the bore properly). In addition, the placement of the sensors and corresponding magnets shown in FIGS. 9A-9B are purely for illustration, and the locations and numbers of magnets (paired or not paired) can be modified such that different configurations of the multi-factor sensor systems are possible.

Logic Table below provides the detection of state for piston/valve assembly 300A.

| Top Sensor 920A | Bottom Sensor 920B | State of piston/valve assembly 300A |
|---|---|---|
| OFF | ON | Angled-Flow or HRVA Orientation |
| ON | OFF | Cross-Flow Orientation |
| OFF | OFF | Fault |
| ON | ON | Fault |

Figure 9C:
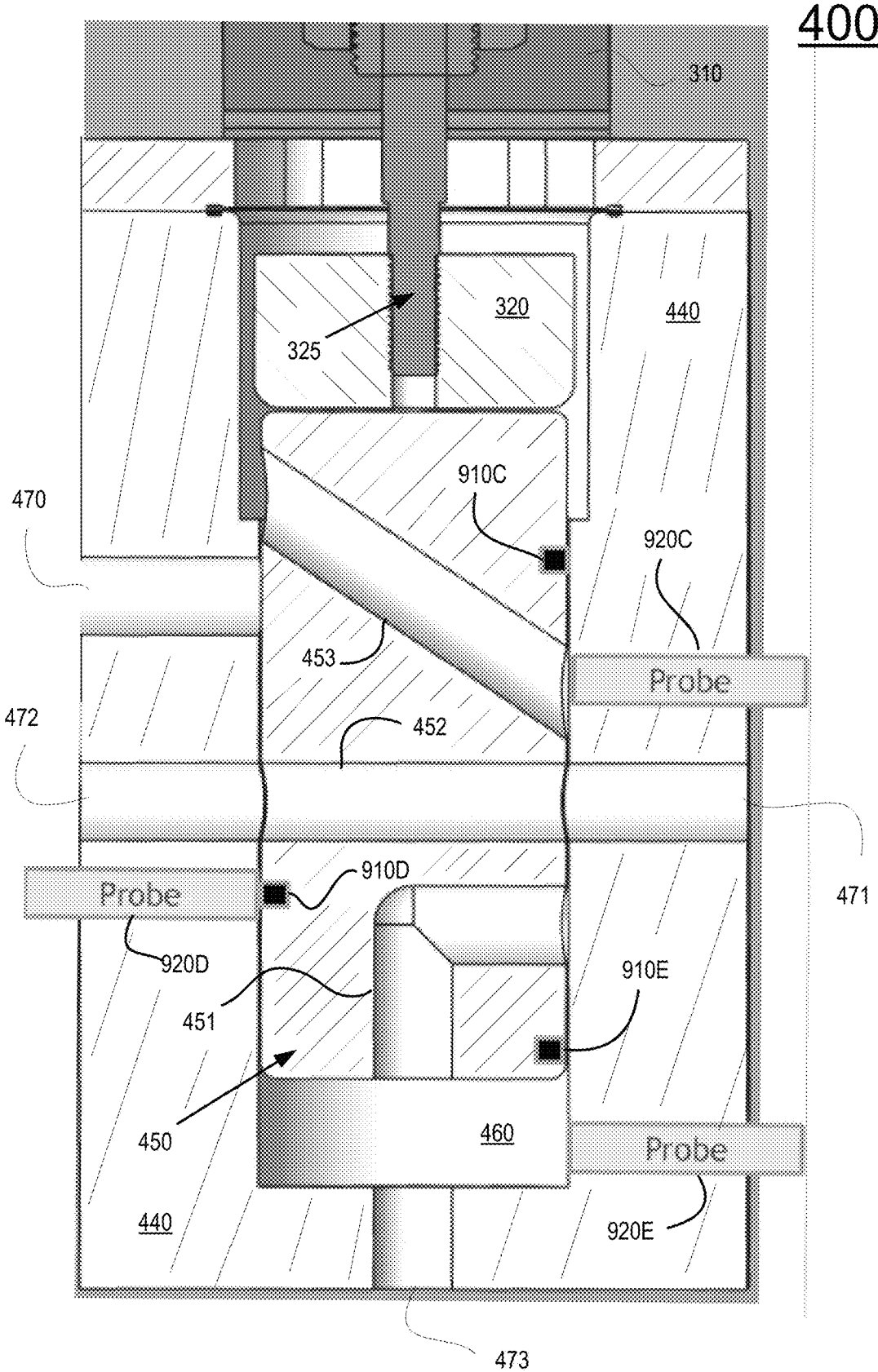
FIG. 9C illustrates a multi-way piston assembly suitable for use in a process chamber for depositing a film on a wafer, wherein the piston assembly includes positioning sensors and corresponding magnets for determining states of the piston assembly sensor magnets and corresponding magnetic sensors, in accordance with one embodiment of the present disclosure.

FIG. 9C illustrates a multi-way piston assembly 400B' suitable for use in a process chamber (e.g., electroplating cell) for depositing a film on a wafer (e.g., wet deposition), wherein the piston assembly includes positioning sensors and corresponding magnets for determining states of the piston assembly sensor magnets and corresponding magnetic sensors, in accordance with one embodiment of the present disclosure. The piston/valve assembly 400B' is similar to the piston/valve assembly 400B of FIGS. 4B-1 through 4B-3, except for the addition of the positioning sensors and corresponding magnets for determining state. For example, the piston/valve assembly 400B' is configured for switching liquid chemical flow from an inlet orifice (e.g., port) to one or more outlet orifices (e.g., ports) with a low pressure drop across the internal valve depending on the position of the piston within the piston valve assembly 400B', and which piston is used within the piston/valve assembly.

The piston/valve assembly 400B' includes a multi-factor sensor system including positioning sensors and corresponding magnets for detecting piston state. In one embodiment, the multi-factor sensor system includes a plurality of magnets 910 (e.g., 910C, 910D, and 910E) at a plurality of locations in the piston 450. In addition, a plurality of magnetic sensors 920 (e.g., 920C, 920D, and 920E) at a plurality of locations in the valve body 440 is configured to pick up or detect a corresponding magnet when properly positioned with respect to each other. As shown in FIG. 9C, three sensor magnet pairs determine state of the piston/valve assembly 400B', including sensor 920C/magnet 910C, sensor 920D/magnet 910D, and sensor 920E/magnet 910E.

The sensor system may be configured as a single-factor or multi-factor system. In the multi-factor embodiment, when one sensor/magnet pair is aligned (e.g., sensor is ON), the remaining sensor/magnet pairs are not aligned, and thereover those sensors may be OFF. For example, as is shown in FIG. 9C, the sensor 920D/magnet 910D pair is aligned, while sensor 920C/magnet 910C and sensor 920E/magnet 910E are not aligned. As such, based on the multi-factor sensor state, the piston/valve assembly 400B' is in an angled orientation (e.g., 90 degree flow path), such as an HRVA orientation. In a single factor embodiment, a sensor/magnet pair is aligned to determine state of the piston/valve assembly 400B' (e.g., for a corresponding flow path).

Figure 10A:
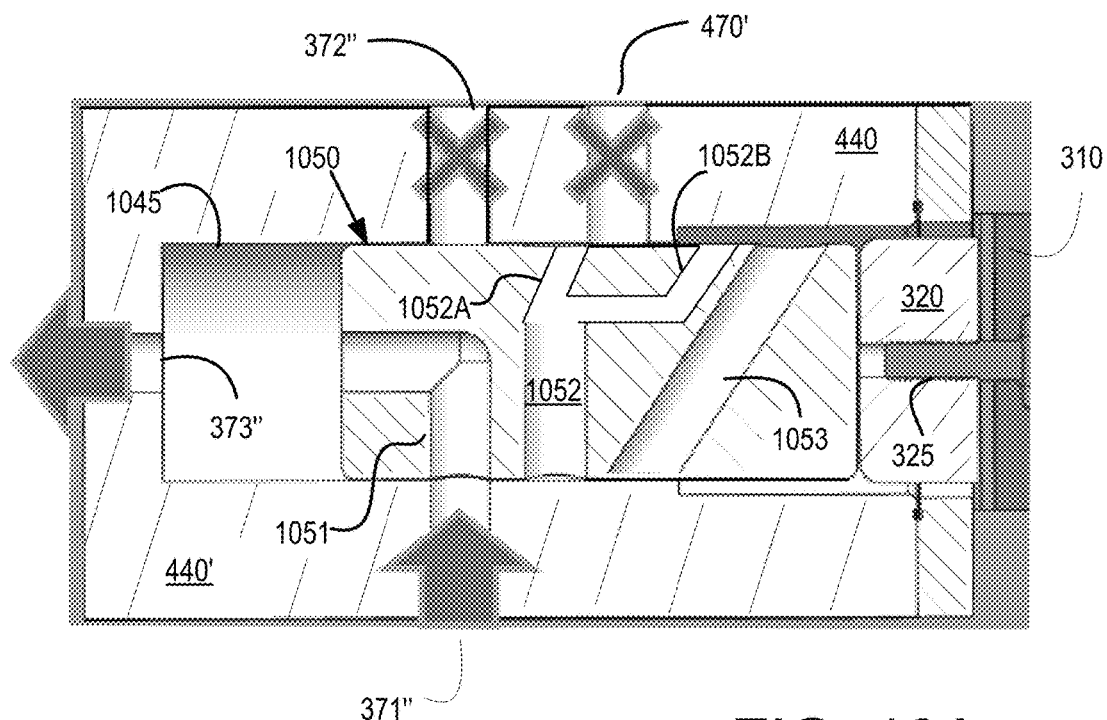
FIG. 10A illustrates a multi-way piston assembly suitable for use in a process chamber for depositing a film on a wafer, wherein the piston is configured for fluid flowing from an inlet to one or more outlets through the piston assembly, wherein the piston assembly may be configured for fluid flowing from an inlet to an outlet via a ninety-degree angled flow path through the piston assembly, wherein the angled flow path may be an HRVA flow orientation, in accordance with one embodiment of the present disclosure.
Figure 10B:
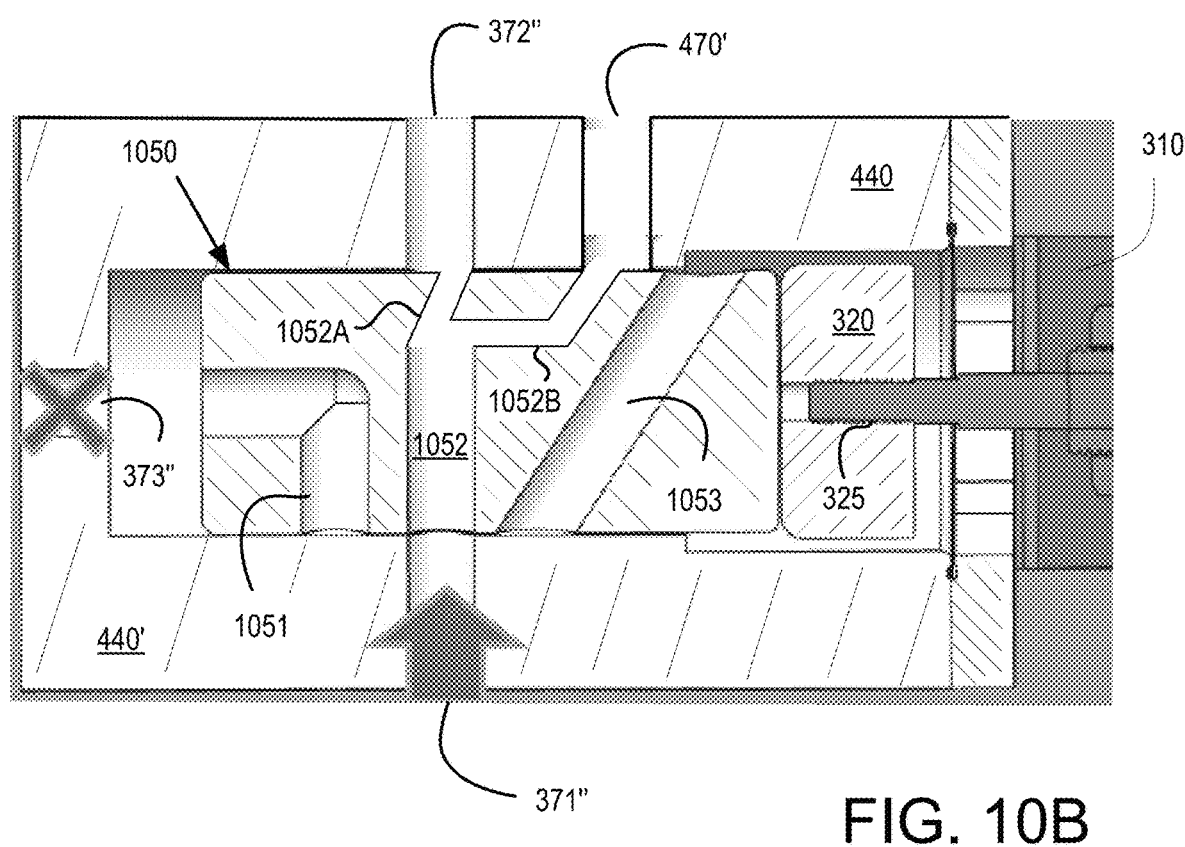
FIG. 10B illustrates a multi-way piston assembly suitable for use in a process chamber for depositing a film on a wafer, wherein the piston is configured for fluid flowing from an inlet to one or more outlets through the piston assembly, wherein the piston may be configured for fluid flowing from an inlet to multiple outlets through the piston assembly via an angled flow path that splits into two flow paths of reduced diameter, in accordance with one embodiment of the present disclosure.
Figure 10C:
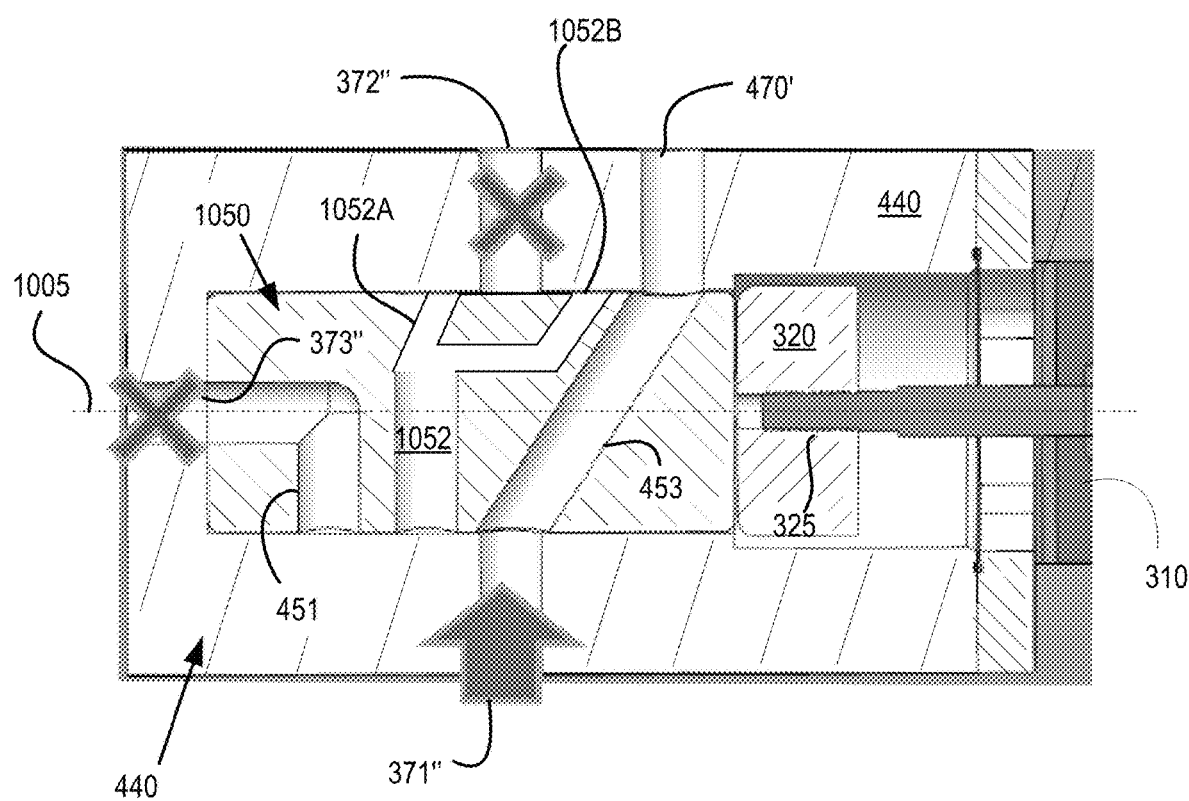
FIG. 10C illustrates a multi-way piston assembly suitable for use in a process chamber for depositing a film on a wafer, wherein the piston is configured for fluid flowing from an inlet to one or more outlets through the piston assembly, wherein the piston may be configured for fluid flowing from an inlet to an outlet via an angled flow path through the piston assembly, wherein the angled flow path may be an HRVA flow orientation, in accordance with one embodiment of the present disclosure.

FIGS. 10A-10C illustrates a multi-way piston/valve assembly 1000 suitable for use in a process chamber (electroplating cell) for depositing a film on a wafer (e.g., wet deposition), wherein the piston 1050 is configured for fluid flowing from an inlet to one or more outlets through the piston/valve assembly 1000, in accordance with one embodiment of the present disclosure. In particular, the piston/valve assembly 1000 is configured for switching liquid chemical flow from an inlet orifice 371" (e.g., port) to one or more outlet orifices 372", 373", and 470' (e.g., ports) with a low pressure drop across the internal valve depending on the position of the piston 1050 within the piston/valve assembly 1000. More particularly, fluid flow can be made to multiple outlet orifices, as will be described below.

The piston/valve assembly 1000 includes a linear motion actuator 310, which also includes the threaded shaft 325, which is driven in a linear manner, such as along a linear axis 1005. Further, threaded shaft 325 is coupled to piston adaptor 320, as previously described, such that linear movement of the threaded shaft 325 is translated into linear movement of the piston adaptor 320, and ultimately to piston 1050.

More particularly, the valve body 440' of the piston/valve assembly 1000 is identical to the valve body of piston/valve assembly 400A and 400B. In particular, valve body 440' is configured to surround a bore 1045 that is aligned with the linear axis 1005. The valve body 440 includes an inlet orifice 371" and a plurality of outlet orifices. For example, the outlets may include outlet orifice 372", orifice 373", and orifice 470'. The piston 1050 is controllably moved through the bore 1045 of valve body 440' to align bores or flow paths in the piston 1050 with the inlet orifice 371" and one or more of the outlet orifices 372" and 373" and 470'.

FIG. 10A is a cross-sectional diagram of a multi-way piston/valve assembly 1000, wherein the piston 1050 is positioned to provide an angled flow path, such as in an HRVA flow orientation. Specifically, when the piston 1050 is in a first position, the bore 1051 is aligned with the inlet orifice 371" and the outlet orifice 373" to provide an angled flow path (e.g., angled turn of 90 degrees through the elbow to provide for an HRVA flow orientation) through the piston/valve assembly 1000.

FIG. 10B is a cross-sectional diagram of the multi-way piston/valve assembly 1000, wherein the piston 1050 is positioned to access multiple internal flow paths. In particular, the piston 1050 is configured for fluid flowing from an inlet to one or more outlets through the piston assembly, and wherein the piston may be configured for fluid flowing from an inlet to multiple outlets through the piston assembly via an angled flow path that splits into two flow paths of reduced diameter. Specifically, when the piston is controllably moved to a second position through motion of the linear motion actuator 310, fluid flows from the inlet orifice 371" to a portion of the outlet orifice 372" and to a portion of the outlet orifice 470'. That is, in the second position of the piston 1050, fluid flows from the inlet 371" through the flow path 1052, and through flow path 1052A to exit out of outlet orifice 372", and through flow path 1052B to exit out of outlet orifice 470'. Flow rates to each of the outlet orifices may be reduced equally, or unequally.

FIG. 10C illustrates a cross-sectional diagram of the multi-way piston assembly 1000 wherein the piston is configured for fluid flowing from an inlet to an outlet via an angled flow path through the piston/valve assembly 1000, wherein the angled flow path may be an HRVA flow orientation, in accordance with one embodiment of the present disclosure. Specifically, when the piston 1050 is controllably moved to a third position through motion of the linear motion actuator, the bore 453 is aligned with the inlet orifice 371" and the outlet orifice 470' to provide for an angled flow path through the piston valve assembly 1000.

Figure 11A:
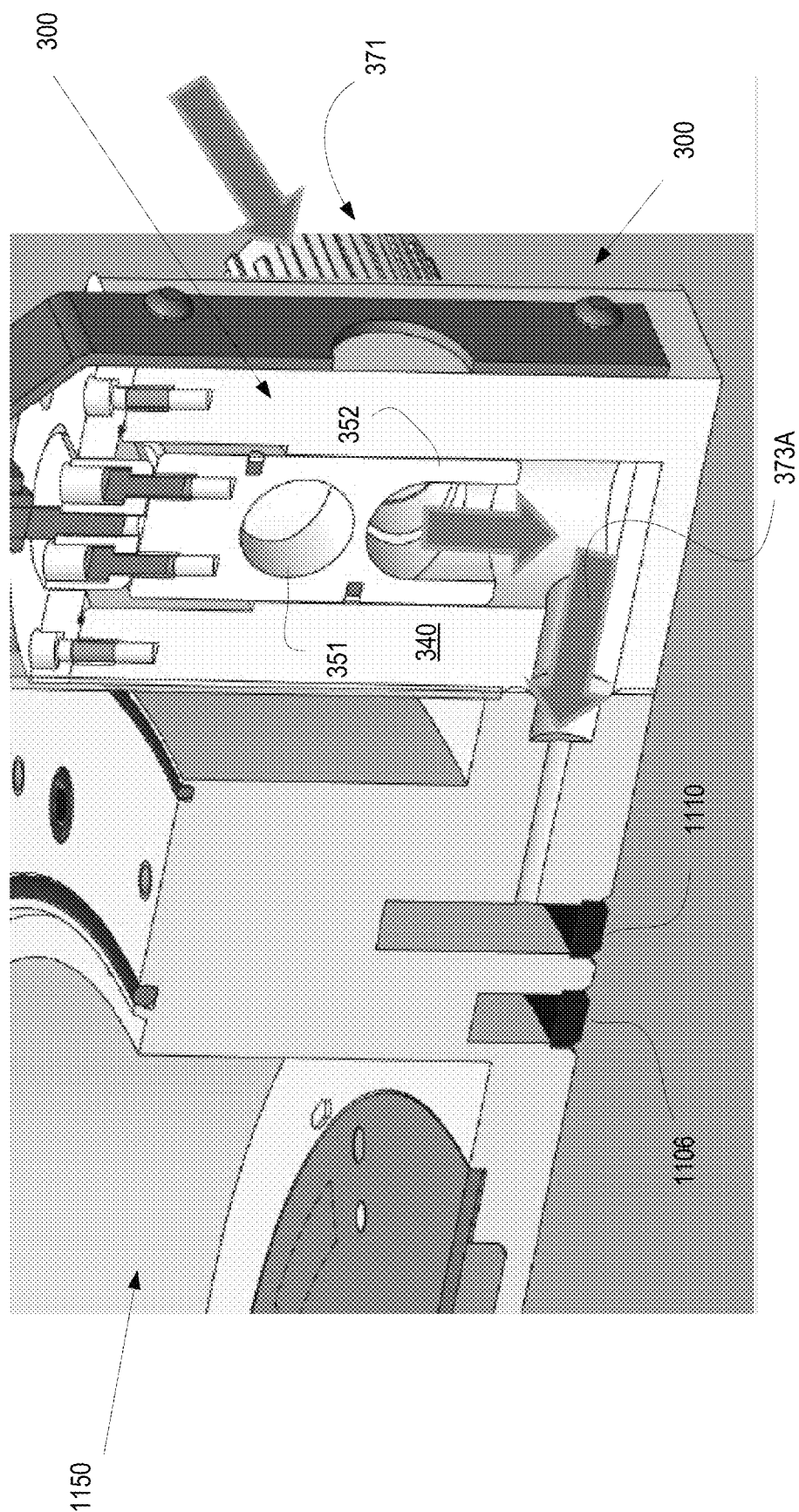
FIG. 11A is a perspective, cut-out cross-section of a three-way piston assembly suitable for use in a process chamber for depositing a film on a wafer, wherein the piston is configured for fluid flowing from an inlet to a selected outlet through the piston assembly, wherein the piston assembly may be configured for fluid flowing from an inlet to an outlet via a ninety-degree angled flow path through the piston assembly, wherein the angled flow path may be an HRVA flow orientation, wherein the piston assembly is mounted external to a process chamber, in accordance with one embodiment of the present disclosure.

FIG. 11A is a perspective, cut-out cross-section of a three-way piston assembly suitable for use in a process chamber (e.g., electroplating cell) 1150 for depositing a film on a wafer, (e.g., wet deposition), wherein the piston is configured for fluid flowing from an inlet to a selected outlet through the piston assembly, in accordance with one embodiment of the present disclosure. As shown, the piston/valve assembly 300 may be configured for fluid flowing from an inlet 371 to an outlet 373A via a ninety-degree angled flow path through the piston/valve assembly 300, such as through the second section 352 of the piston 350. For example, the angled flow path may be an HRVA flow orientation, such that fluid flowing from outlet 373A enters channel 1110 which is directed to a region of the catholyte chamber under the HRVA plate. In one embodiment, the piston/valve assembly 300 is mounted external to the process chamber 1150. In another embodiment, the piston/valve assembly 300 is integrated within the wall of the process chamber 1150.

Figure 11B:
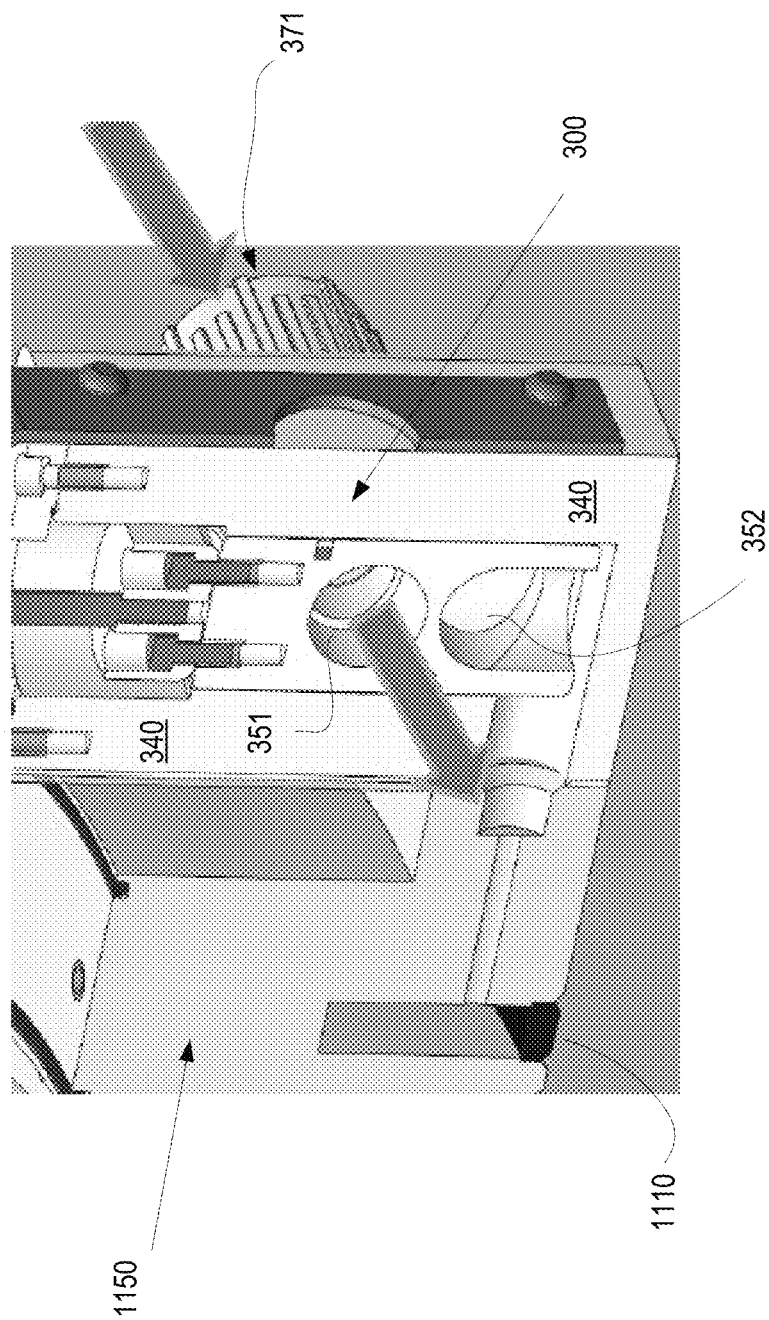
FIG. 11B is a perspective, cut-out cross-section of a three-way piston assembly suitable for use in a process chamber for depositing a film on a wafer, wherein the piston is configured for fluid flowing from an inlet to a selected outlet through the piston assembly, wherein the piston is configured for fluid flowing from an inlet to an outlet via a cross-flow orientation flow path through the piston assembly, wherein the piston assembly is mounted external to a process chamber, in accordance with one embodiment of the present disclosure.
Figure 11C:
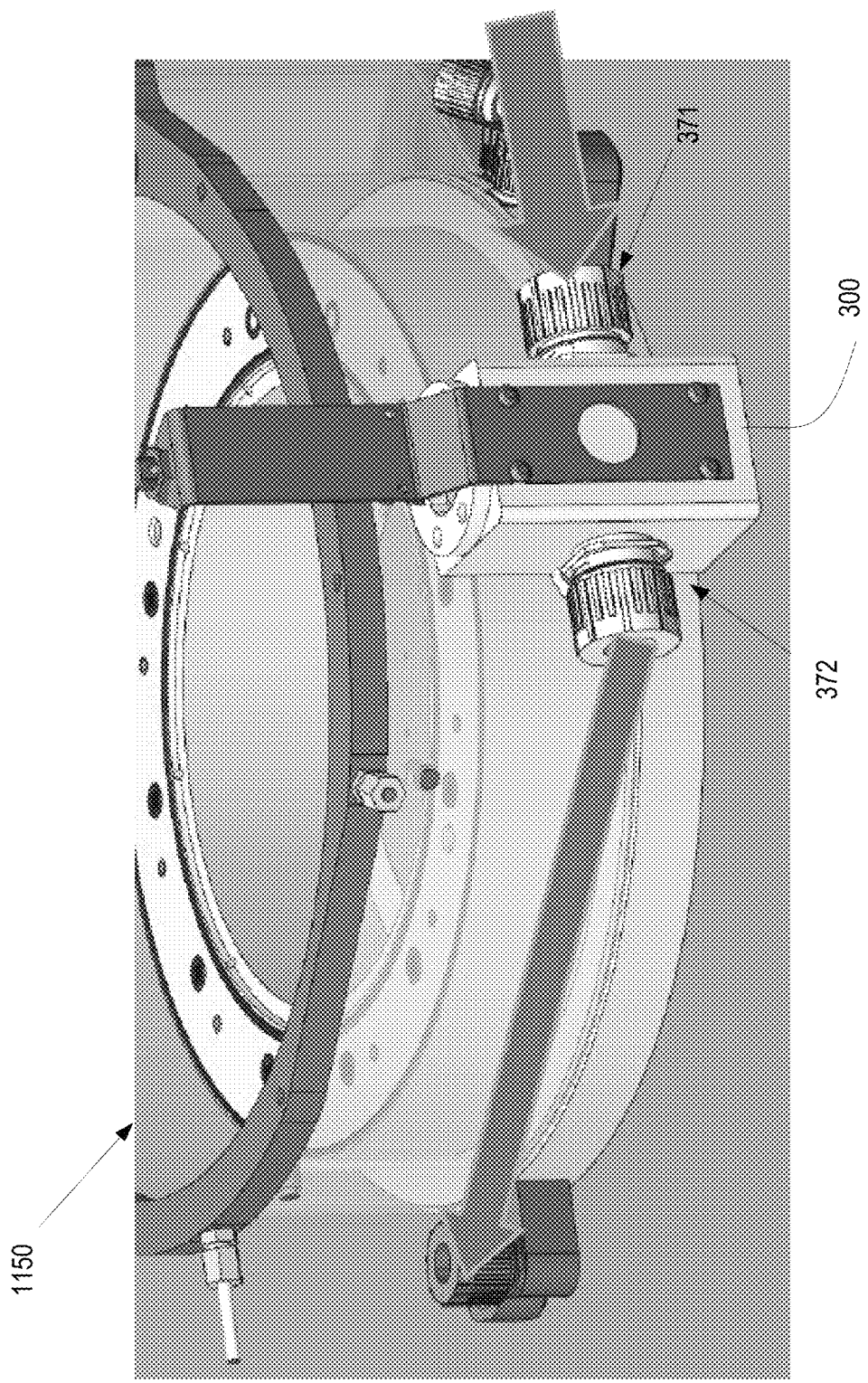
FIG. 11C is a perspective view of a three-way piston assembly suitable for use in a process chamber for depositing a film on a wafer, wherein the piston is configured for fluid flowing from an inlet to a selected outlet through the piston assembly, wherein the piston is configured for fluid flowing from an inlet to an outlet via a cross-flow orientation flow path through the piston assembly, wherein the piston assembly is mounted external to a process chamber, in accordance with one embodiment of the present disclosure.

FIGS. 11B-11C are perspective views and cut-out cross-sections of a three-way piston/valve assembly 300 suitable for use in a process chamber for depositing a film on a wafer (e.g., wet deposition), wherein the piston is configured for fluid flowing from an inlet to a selected outlet through the piston assembly, in accordance with one embodiment of the present disclosure. In the piston/valve assembly 300, the piston may be configured for fluid flowing from an inlet to an outlet via a cross-flow orientation flow path through the piston assembly, such as through the first section 351 of the piston 350. As shown, the piston/valve assembly 300 is mounted external to the process chamber 1150. For example, the fluid flowing in the cross flow orientation may be the primary process flow (e.g., accessing channels 1106 for purposes of delivering fluid to the anolyte chamber through inlet ports).

Figure 12:
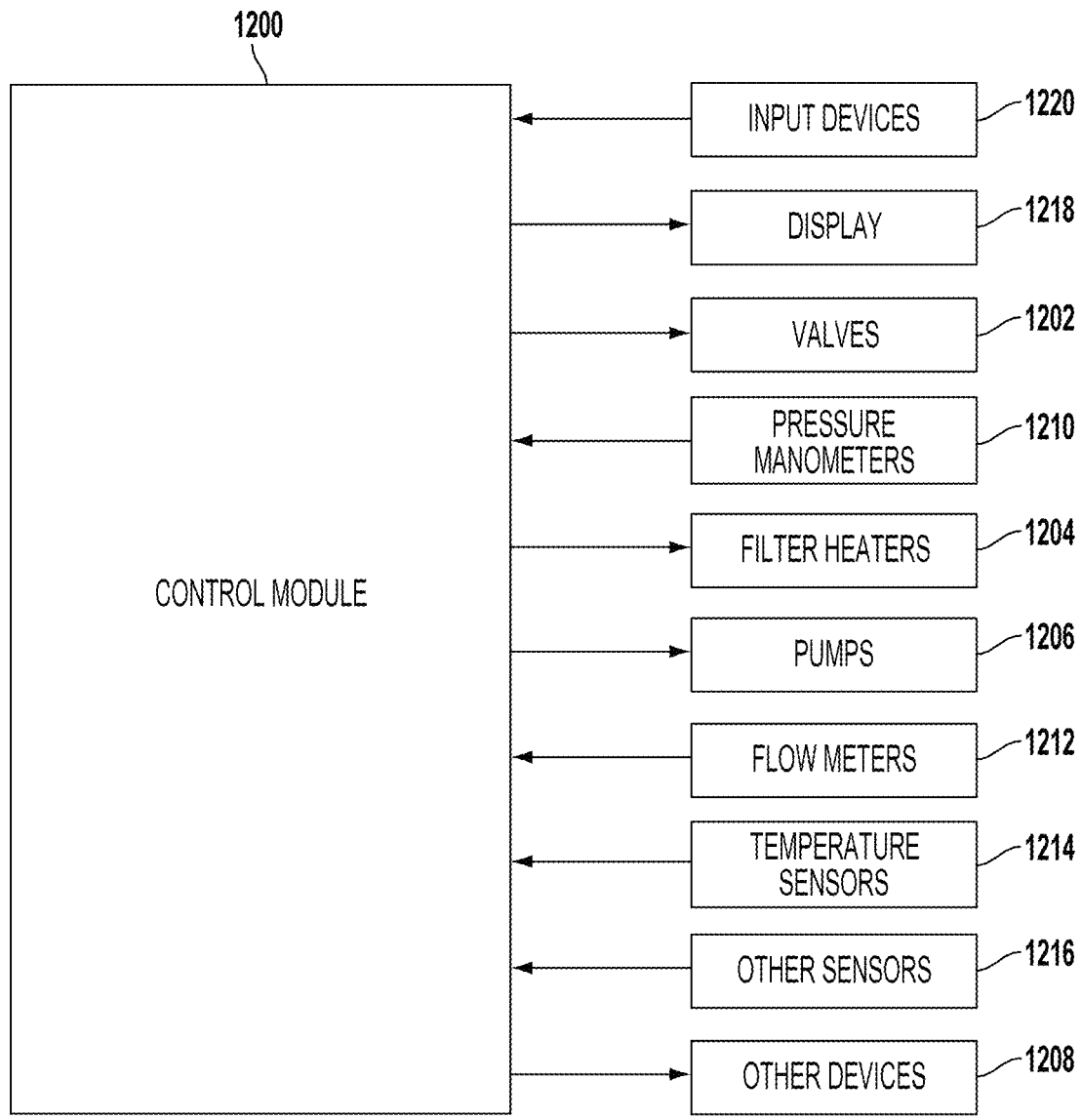
FIG. 12 shows a control module for controlling the systems described above.

FIG. 12 shows a control module 1200 for controlling the systems described above. For instance, the control module 1200 may include a processor, memory and one or more interfaces. The control module 1200 may be employed to control devices in the system based in part on sensed values. For example only, the control module 1200 may control one or more of valves 1202, filter heaters 1204, pumps 1206, and other devices 1208 based on the sensed values and other control parameters. The control module 1200 receives the sensed values from, for example only, pressure manometers 1210, flow meters 1212, temperature sensors 1214, and/or other sensors 1216. The control module 1200 may also be employed to control process conditions during precursor delivery and deposition of the film. The control module 1200 will typically include one or more memory devices and one or more processors.

The control module 1200 may control activities of the precursor delivery system and deposition apparatus. The control module 1200 executes computer programs including sets of instructions for controlling process timing, delivery system temperature, and pressure differentials across the filters, valve positions, mixture of gases, chamber pressure, chamber temperature, substrate temperature, RF power levels, substrate chuck or pedestal position, and other parameters of a particular process. The control module 1200 may also monitor the pressure differential and automatically switch vapor precursor delivery from one or more paths to one or more other paths. Other computer programs stored on memory devices associated with the control module 1200 may be employed in some embodiments.

Typically there will be a user interface associated with the control module 1200. The user interface may include a display 1218 (e.g., a display screen and/or graphical software displays of the apparatus and/or process conditions), and user input devices 1220 such as pointing devices, keyboards, touch screens, microphones, etc.

Computer programs for controlling delivery of precursor, deposition and other processes in a process sequence can be written in any conventional computer readable programming language: for example, assembly language, C, C++, Pascal, Fortran or others. Compiled object code or script is executed by the processor to perform the tasks identified in the program.

The control module parameters relate to process conditions such as, for example, filter pressure differentials, process gas composition and flow rates, temperature, pressure, plasma conditions such as RF power levels and the low frequency RF frequency, cooling gas pressure, and chamber wall temperature.

The system software may be designed or configured in many different ways. For example, various chamber component subroutines or control objects may be written to control operation of the chamber components necessary to carry out the inventive deposition processes. Examples of programs or sections of programs for this purpose include substrate positioning code, process gas control code, pressure control code, heater control code, and plasma control code.

A substrate positioning program may include program code for controlling chamber components that are used to load the substrate onto a pedestal or chuck and to control the spacing between the substrate and other parts of the chamber such as a gas inlet and/or target. A process gas control program may include code for controlling gas composition and flow rates and optionally for flowing gas into the chamber prior to deposition in order to stabilize the pressure in the chamber. A filter monitoring program includes code comparing the measured differential(s) to predetermined value(s) and/or code for switching paths. A pressure control program may include code for controlling the pressure in the chamber by regulating, e.g., a throttle valve in the exhaust system of the chamber. A heater control program may include code for controlling the current to heating units for heating components in the precursor delivery system, the substrate and/or other portions of the system. Alternatively, the heater control program may control delivery of a heat transfer gas such as helium to the substrate chuck.

Examples of sensors that may be monitored during deposition include, but are not limited to, mass flow control modules, pressure sensors such as the pressure manometers 1210, and thermocouples located in delivery system, the pedestal or chuck, and state sensors 920 in FIGS. 9A-9C. Appropriately programmed feedback and control algorithms may be used with data from these sensors to maintain desired process conditions. The foregoing describes implementation of embodiments of the disclosure in a single or multi-chamber semiconductor processing tool.

In some implementations, a controller is part of a system, which may be part of the above-described examples. Such systems can comprise semiconductor processing equipment, including a processing tool or tools, chamber or chambers, a platform or platforms for processing, and/or specific processing components (a substrate pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, substrate transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor substrate or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with, coupled to the system, otherwise networked to the system, or a combination thereof. For example, the controller may be in the "cloud" of all or a part of a fab host computer system, which can allow for remote access of the substrate processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g., a server) can provide process recipes to a system over a network, which may include a local network or the Internet.

The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within their scope and equivalents of the claims.

What is claimed is:

1. A valve assembly suitable for use with a process chamber, comprising:
   a valve body configured to surround a bore aligned with a central axis, wherein the valve body includes an inlet, a first outlet, and a second outlet, wherein at least one of the first outlet and the second outlet exiting into the process chamber;

the valve body configured to surround a travel space adjacent to the bore and aligned with the central axis, wherein a diameter of the travel space is larger than a diameter of the bore;

a piston having a first section and a second section, wherein the first section is configured to have a first flow path, and wherein the second section is configured to have a second flow path;

a piston adapter coupled to the piston and configured for movement within the travel space, wherein linear movement of the piston adapter is translated to linear movement of the piston;

a linear motion actuator adapted to couple with the piston adapter and configured to control the linear movement of the piston adapter through the travel space and the linear movement of the piston through the bore between a first position and a second position, the piston configured to be fully positioned within the bore when pushed through to an end of the bore, wherein in the first position the first section of the piston is aligned with the inlet such that fluid flows from the inlet to the first outlet via the first flow path, wherein in the second position the second section of the piston is aligned with the inlet such that fluid flows from the inlet to the second outlet via the second flow path.

2. The valve assembly of claim 1, further comprising: a seal located between the piston and a surface of the travel space, wherein the seal is configured to prevent fluid from passing from the bore and completely through the travel space a first end of the bore in the valve body, the linear motion actuator coupled to the piston adapter through an end of the travel space.

3. The valve assembly of claim 2, wherein the seal comprises a rolling diaphragm seated between the piston adapter and the piston, wherein an outer edge of the rolling diaphragm is attached to the surface of the travel space.

4. The valve assembly of claim 2, wherein the seal comprises an O-ring.

5. The valve assembly of claim 1, further comprising:
wherein the linear motion actuator comprises a pneumatic cylinder;

the piston adaptor configured to attach to a base of the piston, the base being adjacent to the first section, wherein the piston adaptor is configured to attach to a shaft of the pneumatic cylinder, the linear movement of the shaft being translated to the piston through the piston adaptor.

6. The valve assembly of claim 1, wherein the linear motion actuator comprises a servo motor.

7. The valve assembly of claim 1, wherein fluid entering the valve assembly through the inlet is at a higher pressure than within the bore to induce fluid flow from the inlet to one of the first outlet and the second outlet.

8. The valve assembly of claim 1, further comprising:
a spring mounted within a second end of the bore in the valve body, the spring adapted to push the piston towards a first end of the bore when the linear motion actuator is retracted.

9. The valve assembly of claim 1, further comprising:
a two-factor sensor system for detecting whether the piston is in the first position or the second position, the two-factor sensor system comprising:
a first magnet at a first location in the piston;
a second magnet at a second location in the piston;
a first magnetic sensor at a first location in the valve body; and
a second magnetic sensor at a second location in the valve body,
wherein when the piston is in the first position, the first magnet and the first magnetic sensor are aligned and the second magnet and the second magnetic sensor are not aligned,
wherein when the piston is in the second position, the first magnet and the first magnetic sensor are not aligned and the second magnet and the second magnetic sensor are aligned.

10. The valve assembly of claim 1, wherein the linear motion actuator is configured to control movement of the piston to a third position, such that fluid flows from the inlet to a portion of the first outlet via the first flow path and to a portion of the second outlet via the second flow path.

\* \* \* \* \*